US012665982B2

(12) United States Patent
Vanchinathan et al.

(10) Patent No.: US 12,665,982 B2
(45) Date of Patent: Jun. 23, 2026

(54) COMPOSITE IMAGE GENERATION BASED ON IMAGE SEGMENTATION

(71) Applicant: QUALCOMM Incorporated, San Diego, CA (US)

(72) Inventors: Dharanya Vanchinathan, San Diego, CA (US); Shizhong Liu, San Diego, CA (US); Narayana Karthik Ravirala, San Diego, CA (US); Kevin Yao Han, San Diego, CA (US); Deepak Subramani Velumani, San Diego, CA (US); Weiliang Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 18/451,648

(22) Filed: Aug. 17, 2023

(65) Prior Publication Data

US 2024/0422284 A1 Dec. 19, 2024

Related U.S. Application Data

(60) Provisional application No. 63/508,672, filed on Jun. 16, 2023.

(51) Int. Cl.
*H04N 5/272* (2006.01)
*G06T 7/194* (2017.01)
(Continued)

(52) U.S. Cl.
CPC ............. *H04N 5/272* (2013.01); *G06T 7/194* (2017.01); *H04N 23/632* (2023.01);
(Continued)

(58) Field of Classification Search
CPC ...... H04N 5/272; H04N 23/632; H04N 23/69; G06T 7/194; G06T 2200/24; G06T 2207/20212; G06T 7/11
(Continued)

(56) References Cited

U.S. PATENT DOCUMENTS 8,520,145 B2 8/2013 Wang
9,118,826 B2 * 8/2015 Griffith .................. H04N 5/272
(Continued)

FOREIGN PATENT DOCUMENTS

CN 105335451 A * 2/2016
CN 108322644 A 7/2018
(Continued)

OTHER PUBLICATIONS

International Search Report and Written Opinion—PCT/US2024/033154—ISA/EPO—Aug. 13, 2024.

*Primary Examiner* — Usman A Khan

(74) *Attorney, Agent, or Firm* — QUALCOMM Incorporated

(57) ABSTRACT

Systems and techniques are provided for processing image data. First image data of a scene can be obtained with a first zoom level and including at least a foreground portion and a background portion. A user input can be received indicative of an adjustment to increase or decrease a zoom level of the foreground relative to the background, corresponding to a second zoom level greater or less than the first zoom level. A second image data of the scene can be obtained, based on the adjustment and using the second zoom level, to include an adjusted foreground portion associated with the second zoom level. The adjusted foreground portion can be segmented from the second image data of the scene. A composite image can be generated based on combining the
(Continued)

segmented foreground portion from the second image data with at least a portion of the first image data.

39 Claims, 18 Drawing Sheets

(51) Int. Cl.
  *H04N 23/63* (2023.01)
  *H04N 23/69* (2023.01)

(52) U.S. Cl.
  CPC ......... *H04N 23/69* (2023.01); *G06T 2200/24* (2013.01); *G06T 2207/20212* (2013.01)

(58) Field of Classification Search
  USPC ........................................................ 348/239
  See application file for complete search history.

(56) References Cited

U.S. PATENT DOCUMENTS

| | | | |
|---|---|---|---|
| 9,350,924 | B2 | 5/2016 | Posa |
| 10,867,365 | B2 | 12/2020 | Ogura et al. |

| | | | | |
|---|---|---|---|---|
| 2007/0269108 | A1* | 11/2007 | Steinberg | ................. G06T 7/11 |
| | | | | 382/164 |
| 2008/0030592 | A1* | 2/2008 | Border | ................... H04N 23/45 |
| | | | | 348/E5.042 |
| 2012/0087585 | A1 | 4/2012 | Mori et al. | |
| 2015/0286899 | A1* | 10/2015 | Nakayama | ............... G06T 3/18 |
| | | | | 382/224 |
| 2016/0057363 | A1* | 2/2016 | Posa | .................... H04N 1/2125 |
| | | | | 348/239 |
| 2016/0316147 | A1* | 10/2016 | Bernstein | ........... G06F 3/04842 |
| 2021/0067701 | A1* | 3/2021 | Tagra | .................... H04N 23/62 |
| 2022/0070380 | A1 | 3/2022 | Bernstein et al. | |
| 2022/0358619 | A1* | 11/2022 | Chen | ........................ G06T 7/55 |
| 2023/0325996 | A1* | 10/2023 | Zhang | ................ G06V 10/255 |

FOREIGN PATENT DOCUMENTS

| | | |
|---|---|---|
| CN | 106375662 B | 4/2019 |
| CN | 113438401 B | 8/2022 |
| WO | 2018196854 A1 | 11/2018 |

* cited by examiner

202

FULLY CONNECTED

204

LOCALLY CONNECTED

210

212

214

216

300

310 320 330

360 370 380

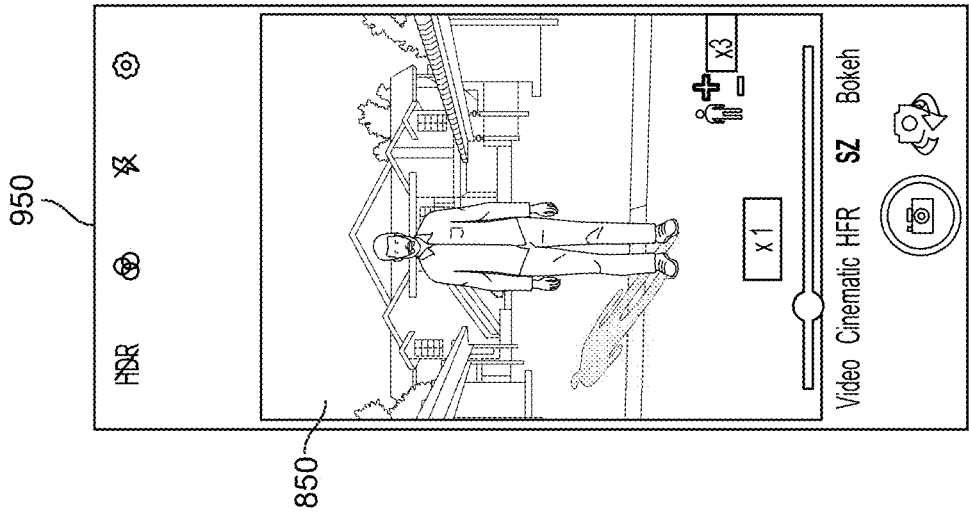
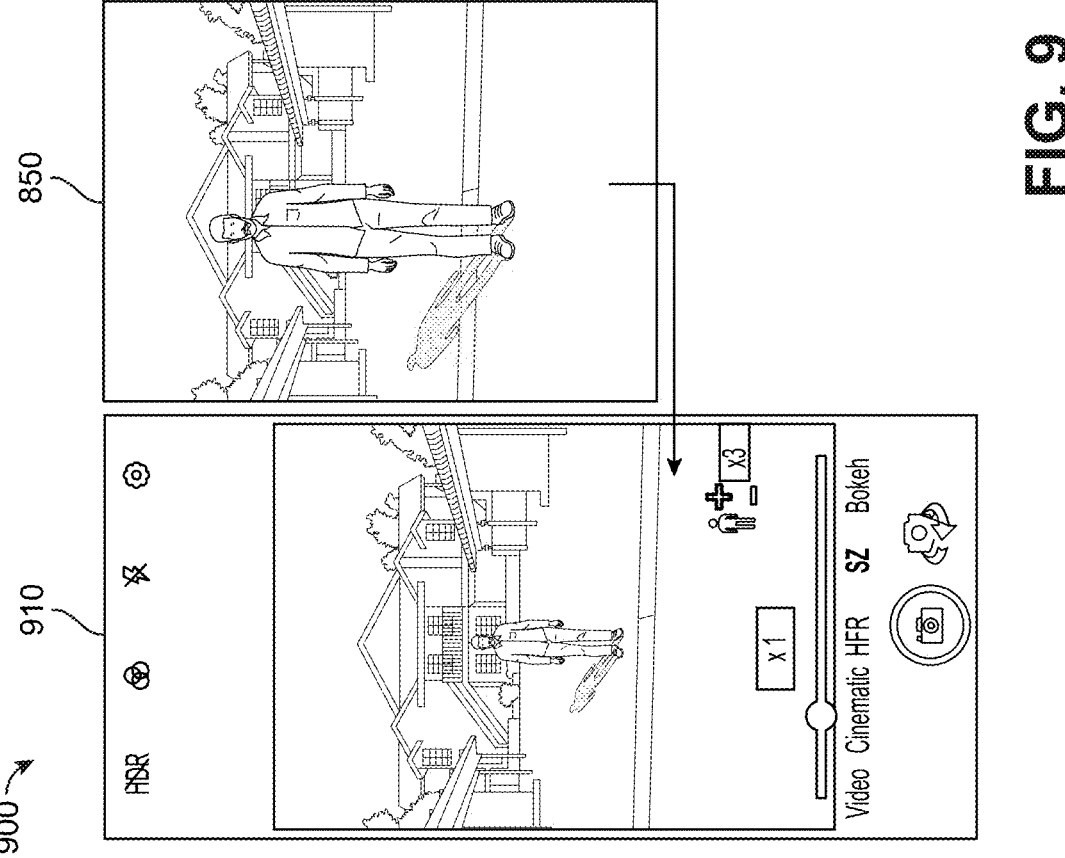
FIG. 9

1300

1310

1320

1500
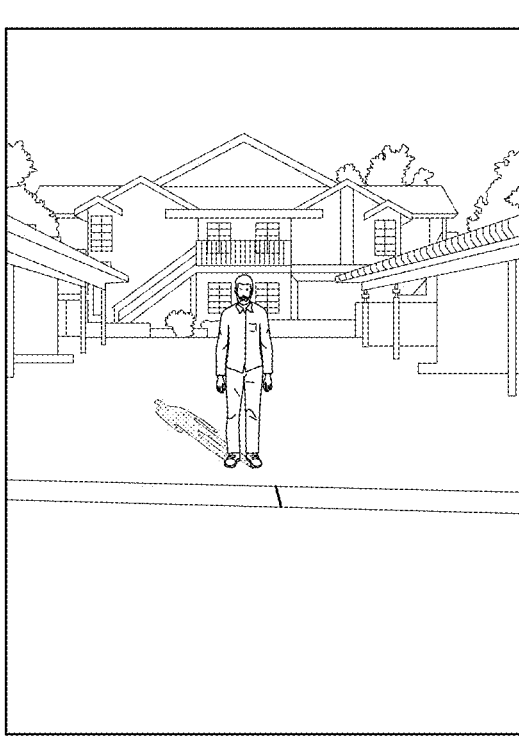
FIG. 15A
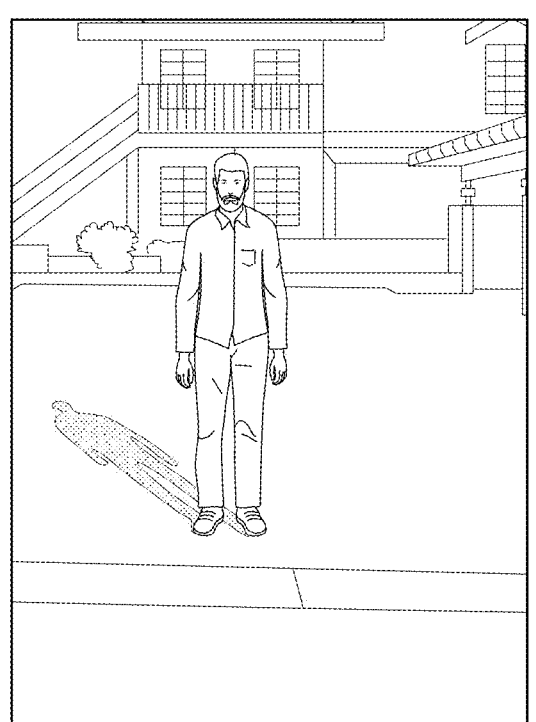
FIG. 15B
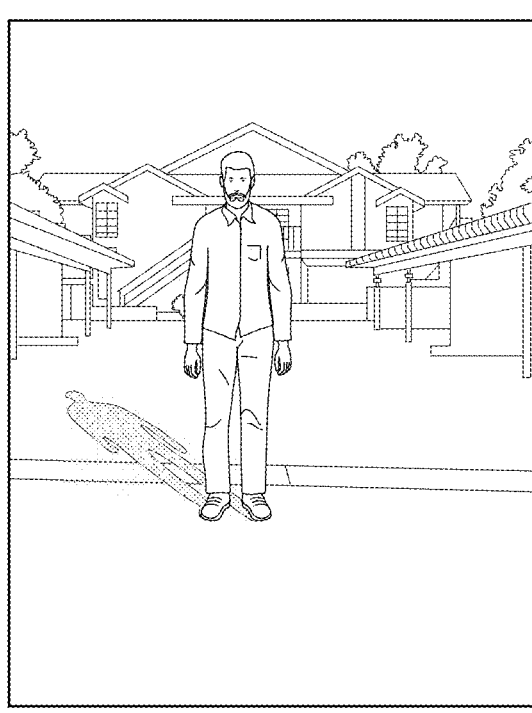
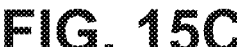
FIG. 15C
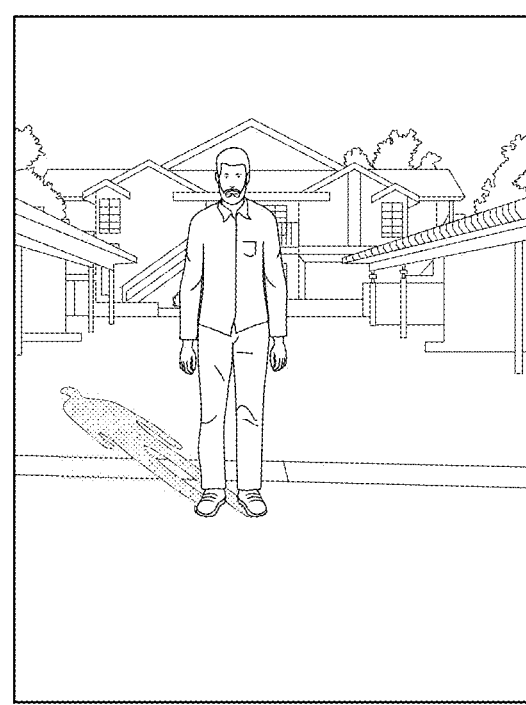
FIG. 15D

1600
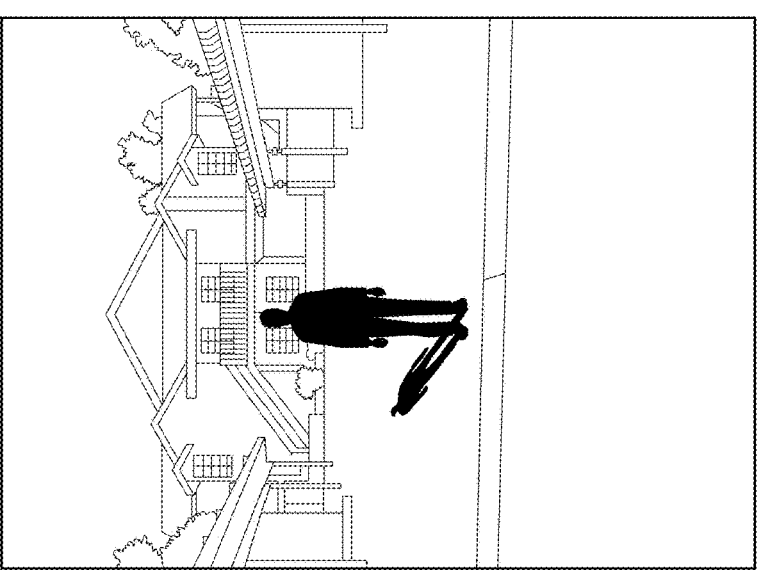
FIG. 16C
FIG. 16B
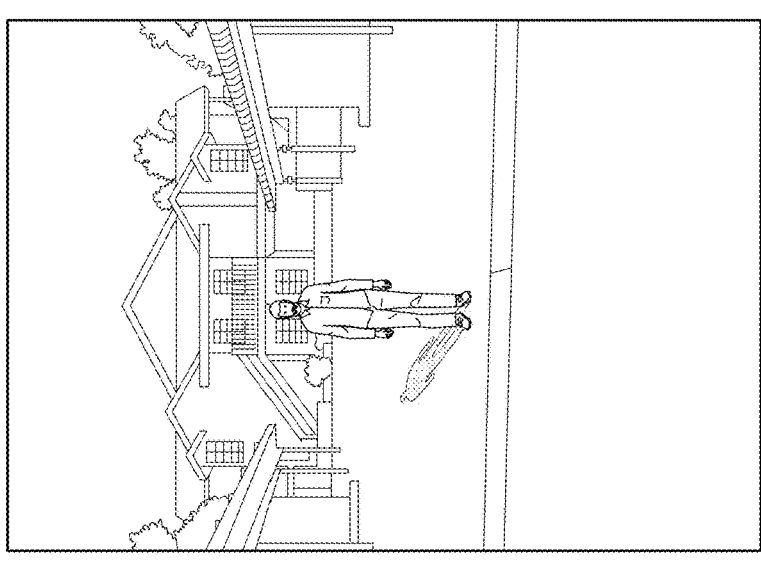
FIG. 16A

1700

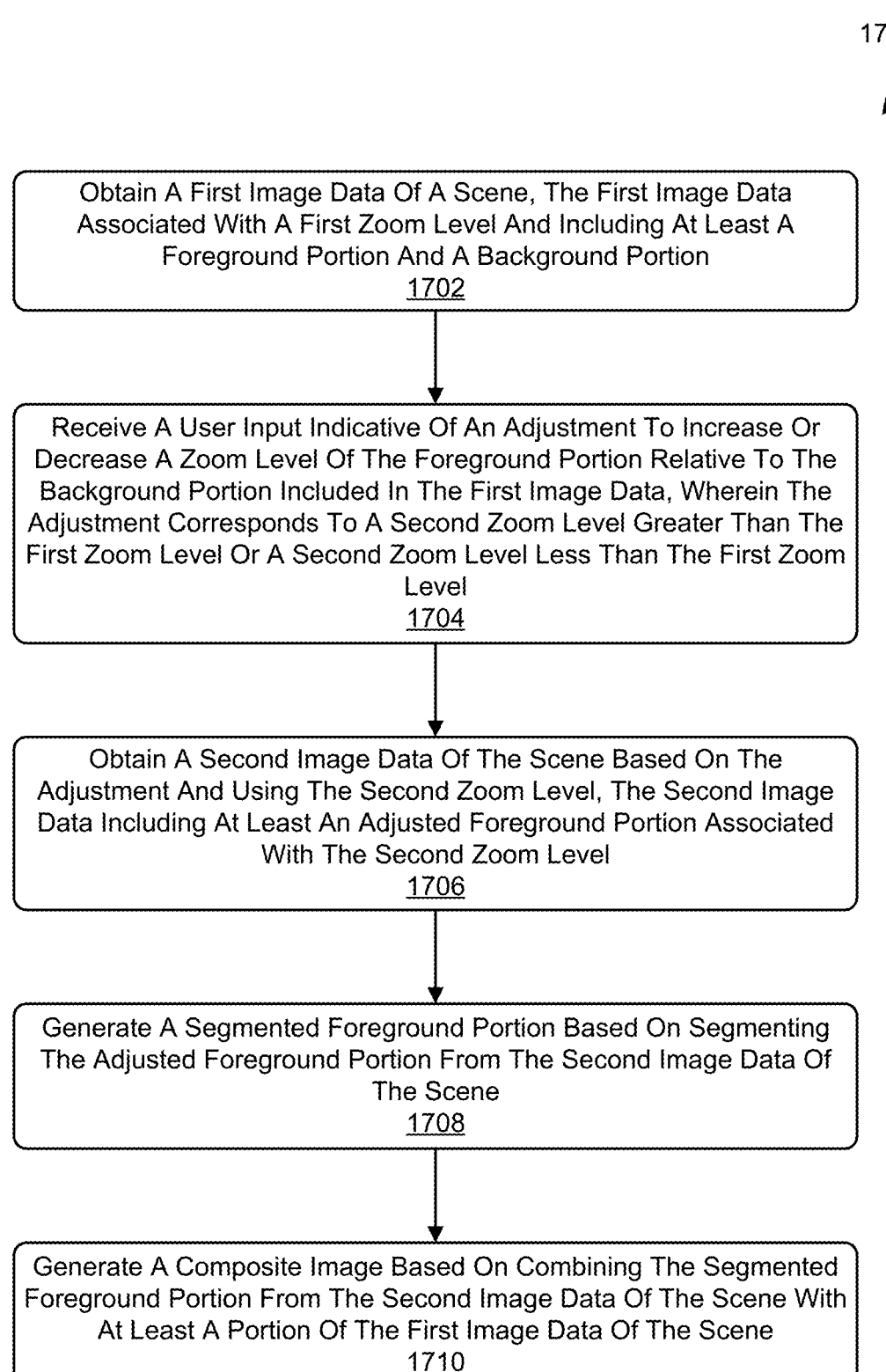

Obtain A First Image Data Of A Scene, The First Image Data Associated With A First Zoom Level And Including At Least A Foreground Portion And A Background Portion
1702

Receive A User Input Indicative Of An Adjustment To Increase Or Decrease A Zoom Level Of The Foreground Portion Relative To The Background Portion Included In The First Image Data, Wherein The Adjustment Corresponds To A Second Zoom Level Greater Than The First Zoom Level Or A Second Zoom Level Less Than The First Zoom Level
1704

Obtain A Second Image Data Of The Scene Based On The Adjustment And Using The Second Zoom Level, The Second Image Data Including At Least An Adjusted Foreground Portion Associated With The Second Zoom Level
1706

Generate A Segmented Foreground Portion Based On Segmenting The Adjusted Foreground Portion From The Second Image Data Of The Scene
1708

Generate A Composite Image Based On Combining The Segmented Foreground Portion From The Second Image Data Of The Scene With At Least A Portion Of The First Image Data Of The Scene
1710

FIG. 17

COMPOSITE IMAGE GENERATION BASED ON IMAGE SEGMENTATION

CROSS-REFERENCE TO RELATED APPLICATIONS

This application claims the benefit of U.S. Provisional Application No. 63/508,672, filed Jun. 16, 2023, which is hereby incorporated by reference, in its entirety and for all purposes.

FIELD

The present disclosure generally relates to image processing. For example, aspects of the present disclosure are related to systems and techniques for generating composite images based on performing image segmentation of multiple images and/or multiple camera image previews.

BACKGROUND

Many devices and systems allow a scene to be captured by generating images (or frames) and/or video data (including multiple frames) of the scene. For example, a camera or a device including a camera can capture one or more images of a scene (e.g., a still image of the scene, one or more frames of a video of the scene, etc.). In some cases, the one or more images can be processed for performing one or more functions, can be output for display, can be output for processing and/or consumption by other devices, among other uses.

A common type of processing performed on images is image segmentation, which involves segmenting image and video frames into multiple portions. For example, image and video frames can be segmented into foreground and background portions. In some examples, semantic segmentation can segment image and video frames into one or more segmentation masks based on object classifications. For example, one or more pixels of the image and/or video frames can be segmented into classifications such as human, hair, skin, clothes, house, bicycle, bird, background, etc. The segmented image and video frames can then be used for various applications. Applications that use image segmentation are numerous, including, for example, computer vision systems, image augmentation and/or enhancement, image background replacement, extended reality (XR) systems, augmented reality (AR) systems, image segmentation, autonomous vehicle operation, among other applications.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for image processing. According to at least one illustrative example, a method of processing image data is provided. The method includes: obtaining first image data of a scene, the first image data associated with a first zoom level and including at least a foreground portion and a background portion; receiving a user input indicative of an adjustment to increase or decrease a zoom level of the foreground portion relative to the background portion included in the first image data, wherein the adjustment corresponds to a second zoom level greater than the first zoom level or a second zoom level less than the first zoom level; obtaining a second image data of the scene based on the adjustment and using the second zoom level, the second image data including at least an adjusted foreground portion associated with the second zoom level; generating a segmented foreground portion based on segmenting the adjusted foreground portion from the second image data of the scene; and generating a composite image based on combining the segmented foreground portion from the second image data of the scene with at least a portion of the first image data of the scene.

In another illustrative example, an apparatus for processing image data is provided. The apparatus includes at least one memory and at least one processor coupled to the at least one memory and configured to: obtain first image data of a scene, the first image data associated with a first zoom level and including at least a foreground portion and a background portion; receive a user input indicative of an adjustment to increase or decrease a zoom level of the foreground portion relative to the background portion included in the first image data, wherein the adjustment corresponds to a second zoom level greater than the first zoom level or a second zoom level less than the first zoom level; obtain a second image data of the scene based on the adjustment and using the second zoom level, the second image data including at least an adjusted foreground portion associated with the second zoom level; generate a segmented foreground portion based on segmenting the adjusted foreground portion from the second image data of the scene; and generate a composite image based on combining the segmented foreground portion from the second image data of the scene with at least a portion of the first image data of the scene.

In another illustrative example, a non-transitory computer-readable storage medium comprising instructions stored thereon which, when executed by at least one processor, causes the at least one processor to: obtain first image data of a scene, the first image data associated with a first zoom level and including at least a foreground portion and a background portion; receive a user input indicative of an adjustment to increase or decrease a zoom level of the foreground portion relative to the background portion included in the first image data, wherein the adjustment corresponds to a second zoom level greater than the first zoom level or a second zoom level less than the first zoom level; obtain a second image data of the scene based on the adjustment and using the second zoom level, the second image data including at least an adjusted foreground portion associated with the second zoom level; generate a segmented foreground portion based on segmenting the adjusted foreground portion from the second image data of the scene; and generate a composite image based on combining the segmented foreground portion from the second image data of the scene with at least a portion of the first image data of the scene.

In another illustrative example, an apparatus is provided for processing image data. The apparatus includes: means for obtaining first image data of a scene, the first image data associated with a first zoom level and including at least a foreground portion and a background portion; means for receiving a user input indicative of an adjustment to increase or decrease a zoom level of the foreground portion relative to the background portion included in the first image data, wherein the adjustment corresponds to a second zoom level greater than the first zoom level or a second zoom level less than the first zoom level; means for obtaining a second image data of the scene based on the adjustment and using the second zoom level, the second image data including at least an adjusted foreground portion associated with the second zoom level; means for generating a segmented foreground portion based on segmenting the adjusted foreground portion from the second image data of the scene; and means for generating a composite image based on combining the segmented foreground portion from the second image data of the scene with at least a portion of the first image data of the scene.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 illustrates an example of an image capture preview UI that can be used to preview the composite image of FIG. 8 prior to receiving a command to capture an image, in accordance with some examples;

FIGS. 15A-D illustrate example images corresponding to shadow matting and/or shadow compositing, in accordance with some examples;

FIGS. 16A-C illustrates example images corresponding to image completion and/or image inpainting, in accordance with some examples;

FIG. 17 is a flow diagram illustrating an example of a process for processing image and/or video data, in accordance with some examples.

DETAILED DESCRIPTION

Figure 1:
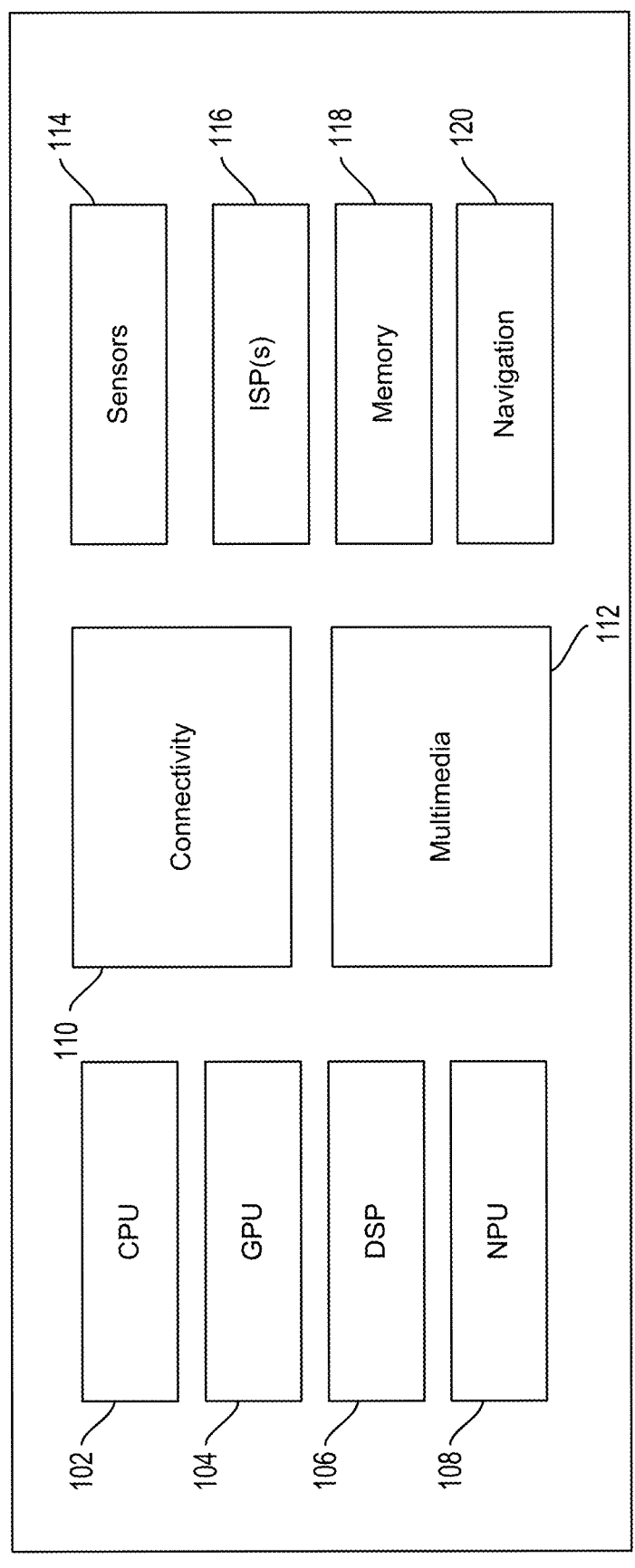
FIG. 1 illustrates an example implementation of a system-on-a-chip (SoC), in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects of the application. However, it will be apparent that various aspects and examples may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims Image semantic segmentation is a task of generating segmentation results for a frame of image data, such as a still image or photograph. Video semantic segmentation is a type of image segmentation that includes a task of generating segmentation results for one or more frames of a video (e.g., segmentation results can be generated for all or a portion of the image frames of a video). Image semantic segmentation and video semantic segmentation can be collectively referred to as "image segmentation" or "image semantic segmentation." Segmentation results can include one or more segmentation masks generated to indicate one or more locations, areas, and/or pixels within a frame of image data that belong to a given semantic segment (e.g., a particular object, class of objects, etc.). For example, as explained further below, each pixel of a segmentation mask can include a value indicating a particular semantic segment (e.g., a particular object, class of objects, etc.) to which each pixel belongs.

In some examples, features can be extracted from an image frame and used to generate one or more segmentation masks for the image frame based on the extracted features. In some cases, machine learning can be used to generate segmentation masks based on the extracted features. For example, a convolutional neural network (CNN) can be trained to perform semantic image segmentation by inputting into the CNN many training images and providing a known output (or label) for each training image. The known output for each training image can include a ground-truth segmentation mask corresponding to a given training image.

In some cases, image segmentation can be performed to segment image frames into segmentation masks based on an object classification scheme (e.g., the pixels of a given semantic segment all belong to the same classification or class). For example, one or more pixels of an image frame can be segmented into classifications such as human, hair, skin, clothes, house, bicycle, bird, background, etc. In some examples, a segmentation mask can include a first value for pixels that belong to a first classification, a second value for pixels that belong to a second classification, etc. A segmentation mask can also include one or more classifications for a given pixel. For example, a "human" classification can have sub-classifications such as 'hair,' 'face,' or 'skin,' such that a group of pixels can be included in a first semantic segment with a 'face' classification and can also be included in a second semantic segment with a 'human' classification.

Segmentation masks can be used to apply one or more processing operations to a frame of image data. For instance, a system may perform image augmentation and/or image enhancement for a frame of image data based on a semantic segmentation mask generated for the frame of image data. In one example, the system may process certain portions of a frame with a particular effect, but may not apply the effect to a portion of the frame corresponding to a particular class indicated by a segmentation mask for the frame. Image augmentation and enhancement processes can include, but are not limited to, personal beautification, such as skin smoothing or blemish removal; background replacement or blurring; providing an extended reality (XR) experience (e.g., a virtual reality (VR), augmented reality (AR), or mixed reality (MR) experience); etc. Semantic segmentation masks can also be used to manipulate certain objects or segments in a frame of image data, for example by using the semantic segmentation mask to identify the pixels in the image frame that are associated with the object or portions to be manipulated. In one example, background objects in a frame can be artificially blurred to visually separate them from an in-focus or foreground object of interest (e.g., a person's face) identified by a segmentation mask for the frame (e.g., an artificial bokeh effect can be generated and applied based on the segmentation mask), where the object of interest is not blurred. In some cases, visual effects can be added to a frame of image data using the segmentation information.

Some image capture devices can include multiple cameras, lenses, image sensors, and/or imaging systems, etc. For instance, smartphones and other mobile computing devices may include a first camera corresponding to a first focal length (e.g., a first zoom level), a second camera corresponding to a second focal length (e.g., a second zoom level), etc. For example, a smartphone may include a first camera corresponding to a 1× zoom level, a second camera corresponding to a 3× zoom level (or other telephoto zoom level greater than 1×), and/or a third camera corresponding to a 0.5× zoom level (or other wide-angle zoom level less than 1×).

Different cameras and/or images captured using different focal lengths (e.g., different zoom levels) may depict different views of the same scene. For example, a foreground portion may appear relatively larger in an image captured using a 3× telephoto zoom level than in an image captured using a 0.5× wide-angle zoom level. A background portion may also appear relatively larger in the image captured using the 3× telephoto zoom level than in the image captured using the 0.5× wide-angle zoom level. A foreground portion can be associated with one or more objects, for example, a foreground subject (e.g., a person, etc.). A background portion can be associated with one or more objects, for example a background subject (e.g., a building, etc.) In some cases, a background portion can be associated with one or more objects that may be referred to as "background objects." Based on the location of the camera, the size of various foreground and background portions, and/or the framing of the image, the foreground and background portions (e.g., and respective objects and/or subjects thereof) may be fully captured in the image frame when using a first zoom level or focal length and may be partially captured in the image frame when using a second zoom level or focal length.

In some cases, different zoom levels may be more suitable for capturing different portions of a scene. For instance, when capturing an image of a person standing close to a tall building, a 0.5× or wide-angle image of the scene can include a full view of the building (e.g., a background portion) but a relatively small view of the person (e.g., a foreground portion). A 3× or telephoto image of the scene can include a close up or full view of the person but only a partial view of the building. There is a need for systems and techniques that can be used to automatically compose a composite image using image data capturing using different cameras and/or different focal lengths (e.g., different zoom levels). There is also a need for systems and techniques that can be used to compose and adjust a composite image using an image capture preview user interface (UI) of an imaging device, where a first frame corresponding to the composite image (e.g., a preview frame of the composite image) is generated and displayed on the UI prior receiving an input to capture a final composite image (e.g., prior to receiving a command to capture an image).

Systems, apparatuses, processes (also referred to as methods), and computer-readable media (collectively referred to as "systems and techniques") are described herein for generating composite images based on performing image segmentation of multiple images and/or multiple camera image preview frames (e.g., first frames obtained prior to receiving an input to capture an image) using a machine learning system. For example, the systems and techniques can be used to generate a composite image that includes one or more foreground portions and one or more foreground portions that are captured using different respective focal lengths (e.g., also referred to as different zoom levels) and different respective cameras. For example, the multiple images can be obtained using different cameras and different zoom levels (e.g., different focal lengths, different digital zoom or crop levels, etc.). In some aspects, each image of the multiple images can be obtained using a corresponding camera included on a smartphone, mobile computing device, imaging device, etc.

As used herein, a preview of a composite image can also be referred to as a "preview frame" and/or a "composite image preview frame." In some aspects, a captured composite image (e.g., the final composite image) can also be referred to as a "composite image frame" and/or a "captured composite image frame." In one illustrative example, a first frame can be captured and/or outputted prior to receiving an input to capture a frame. The input to capture a frame can be received subsequent to capturing and/or outputting the first frame. A captured frame can be captured and/or outputted based on the input to capture a frame, where the captured frame is subsequent to the first frame and the input to capture a frame. In some aspects, the first frame is a preview frame corresponding to an image and the captured frame is a captured frame corresponding to the image and/or corresponding to the preview frame.

For instance, the systems and techniques can be used to generate or capture a composite image frame, based on receiving one or more user inputs corresponding to respective foreground and/or background object zoom levels of a composite image preview frame (e.g., a first composite image frame output prior to an input to capture a frame). The composite image preview frame can correspond to the captured composite image frame, and vice versa. In some aspects, the composite image preview frame(s) and the captured composite image frame can correspond to one or more composite images generated based on the segmentation of multiple images and/or multiple camera image previews using the machine learning system noted above. In some examples, the composite image frame corresponds to the composite image of the preview frame. In some cases, generating a composite image comprises generating a preview frame corresponding to the composite image (e.g., a first composite image frame output prior to an input to capture a frame). The captured composite image frame can be the same as or similar to the preview frame (e.g., the captured composite image frame can be a second frame generated and output subsequent to a first frame and subsequent to receiving an input to capture a frame). In some cases, the captured composite image frame can be different from the preview frame.

In some aspects, the systems and techniques can be used to independently control the zoom level and position of various objects in a scene at the time of composition by the user. For instance, the zoom level and/or position of various objects (e.g., person, pet, flowers, etc.) can be independently controlled or adjusted relative to one another and/or relative to the background of the composed image. In one illustrative example, the zoom level and/or position of various objects in the foreground or background of the composed image scene can be adjusted at the time of composition by the user, based on the user providing one or more user inputs corresponding to the adjustments prior to initiating or triggering the capture of the composite image (e.g., prior to receiving a command to capture an image). For instance, the zoom level and/or positions of the various objects can be adjusted based on one or more user inputs to an image capture preview user interface (UI), and a corresponding composite image preview can be generated and displayed on the image capture preview UI in real-time (e.g., using corresponding image capture previews from multiple cameras on the device). In some examples, image data can be captured using multiple (or all) cameras of a device, and can be stored and used to manipulate the zoom level and/or positions of various foreground or foreground portions post-image capture (e.g., in a gallery or image viewing application running on the device, etc.).

The systems and techniques can use image data obtained from multiple cameras that are included in a smartphone, mobile computing device, or other image capture device used to implement a segmentation zoom UI. The segmentation zoom UI can be the same as the image capture preview UI. The multiple cameras with different zoom levels or focal lengths can be used to generate composite images and composite image previews (e.g., first frames outputted prior to receiving an input to capture a frame) with selective zoom in or zoom out of foreground and/or foreground portions. The use of multiple cameras to obtain simultaneous image data at different zoom levels or focal lengths can provide improved image quality of the zoomed in or zoomed out object relative to increasing or decreasing the object size using interpolation or other image resizing techniques.

One or more image segmentation machine learning networks can be used to find foreground portions (e.g., including one or more objects associated with the foreground portion(s), for example a foreground subject, which may include a person, etc.) and separate the corresponding pixels or image data of the foreground portion(s). In some cases, the foreground portion and corresponding shadow of the foreground portion can be segmented from a foreground image data source. The foreground image data source can be image preview data or image capture data associated with a camera having a first focal length. Background image data can be obtained as image preview data or image capture data associated with a camera having a second focal length different from the first focal length.

For example, image preview data can be live preview data associated and/or generated by a camera and/or image capture device, etc. In some cases, an image preview or an image preview data can also be referred to as a live image preview or a live image preview data, respectively. In some examples, live image preview data can be obtained prior to an image capture input and/or receiving a command to capture an image (e.g., selection of a capture UI element, activation of an image capture trigger, etc.). For instance, image preview data can correspond to a first frame that is output prior to receiving an input to capture a frame. In some cases, live image preview data can be outputted using a display of an image capture device and utilized by a user (e.g., of the image capture device) to review and/or compose the image prior to capturing the image. For example, live image preview data can be provided on a display of an image capture device while trying to capture a scene. In some examples, the live image preview data can be obtained after raw sensor data (e.g., collected by the image capturing device's sensors) has undergone various pre-processing stages such as demosaicing, denoising, etc. In some aspects, the systems and techniques can be included in and/or implemented as one or more pre-processing stages of a live image preview data pipeline. For example, one or more (or all) of the processing blocks 510, 520, 530, 540, 550, and/or 560 of FIG. 5 can be used to generate a live image preview data with zoom segmentation applied to increase or decrease a zoom level of a foreground portion of an image relative to a zoom level of a background portion of the image. As used herein, "live image preview data" may also be referred to as "image preview data."

After segmenting the foreground portion from the foreground image data, image matting and image composition can be performed to generate a composite image that combines the segmented foreground portion with the background image data. In some aspects, image completion and/or image inpainting can be used to remove the foreground portion from the background image data. The segmented foreground portion can be combined with the background image data with the foreground portion removed. In some examples, image harmonization can be performed to generate a composite image with color temperature, white balance, etc., matched across the portion of image data obtained from the foreground image data and the portion of image data obtained from the background image data.

Various aspects of the present disclosure will be described with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform semantic image segmentation according to aspects of the present disclosure. In some cases, by using neural network architectures such as transformers and/or shifted window transformers in determining one or more segmentation masks, aspects of the present disclosure can increase the accuracy and efficiency of semantic image segmentation.

In general, machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
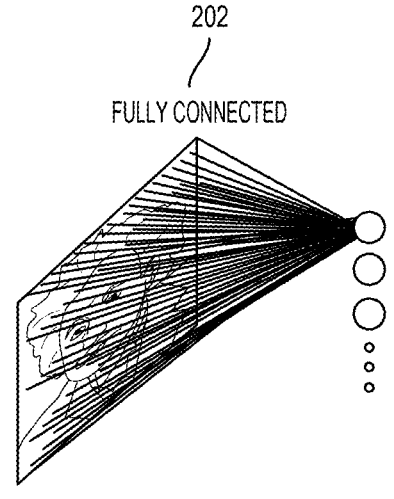
FIG. 2A illustrates an example of a fully connected neural network, in accordance with some examples.
Figure 2B:
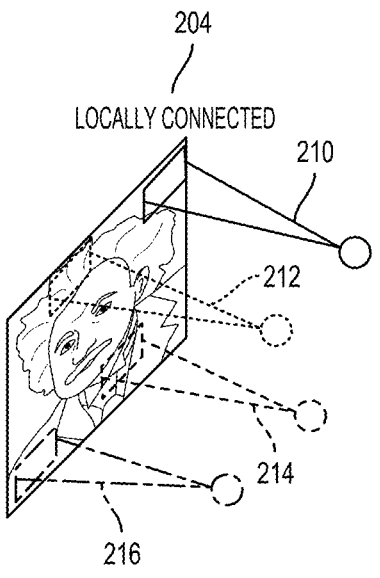
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

As mentioned previously, the systems and techniques described herein can be used to generate composite images based on performing image segmentation of multiple images and/or multiple camera image previews (e.g., first frames outputted prior to receiving an input to capture a frame) using a machine learning system (e.g., such as those described above with reference to FIGS. 1, 2A and 2B). Generating composite images can include generating a composite image preview frame (e.g., a first composite image frame outputted prior to receiving an input to capture a frame), generating a composite image frame (e.g., a captured composite image frame, generated subsequent to the first frame and/or subsequent to receiving an input to capture a frame), and/or a combination of the two. For instance, generating composite images can include generating one or more composite image preview frames, and generating (e.g., capturing) a composite image frame based on the one or more preview frames. In some aspects, the multiple images can be obtained using different cameras and different zoom levels (e.g., different focal lengths, different digital zoom or crop levels, etc.). In some aspects, each image of the multiple images can be obtained using a corresponding camera included on a smartphone, mobile computing device, imaging device, etc.

Figure 3A:
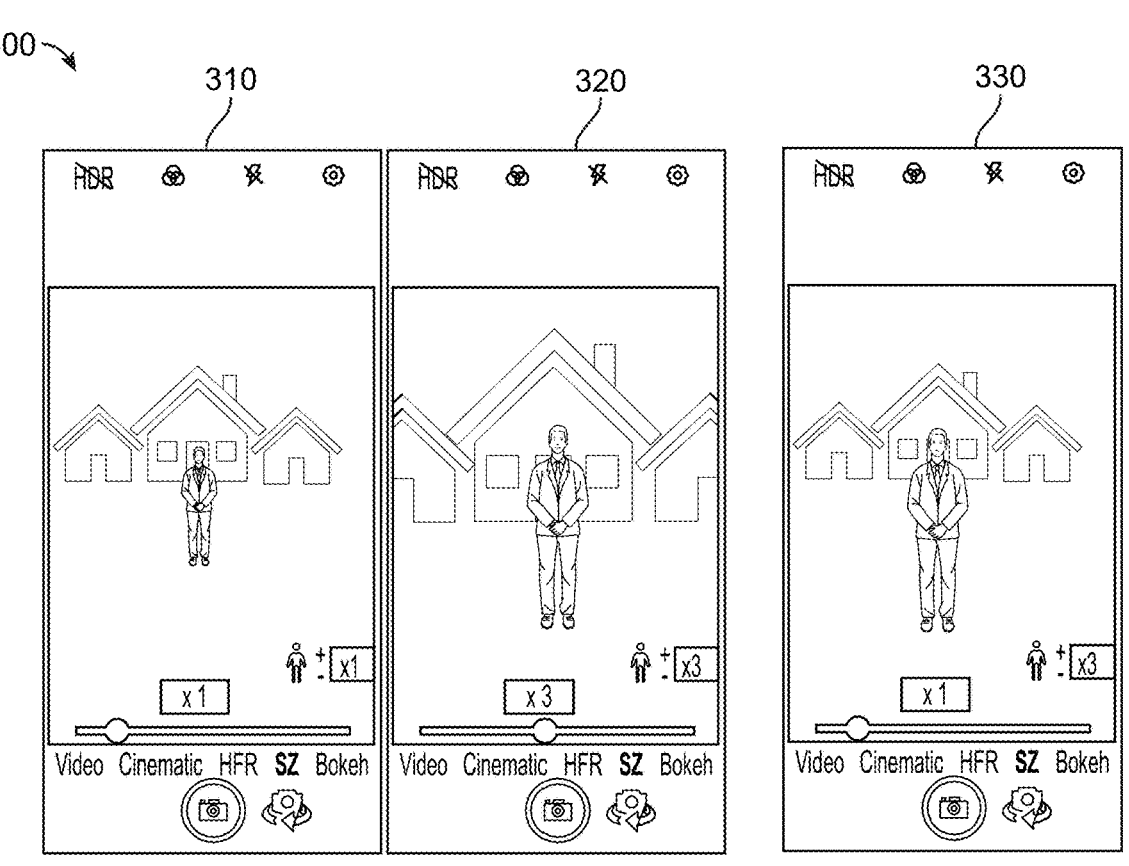
FIG. 3A illustrates an example of a composite image generated based on obtaining foreground information from a first image captured at a first zoom level and obtaining background information from a second image captured at a second zoom level that is less than the first zoom level, in accordance with some examples.

FIG. 3A illustrates an example of composite image generation 300 where a composite image 330 is generated based on obtaining foreground information from a first image 320 captured at a first zoom level and obtaining background information from a second image 310 captured at a second zoom level that is less than the first zoom level. For instance, the example composite image generation 300 can correspond to a scenario where a person (e.g., a foreground subject, or other object associated with a foreground portion) is standing very close to a tall building (e.g., a background object, or other object associated with a background portion). In this scenario, image 310 is a wide-angle image obtained using a 1× zoom level and image 320 is a telephoto image obtained using a 3× zoom level. The wide-angle image 310 can be obtained using a first camera and the telephoto image 320 can be obtained using a second camera. The systems and techniques described herein can be used to generate the composite image 330 to include foreground information of the person corresponding to the telephoto image 320 and background information of the house corresponding to the wide-angle image 310.

In some examples, image 310 can be a first image preview frame (e.g., a first frame outputted prior to receiving an input to capture a frame) having a first zoom level, and image 320 can be a second image preview frame (e.g., a second frame outputted prior to receiving an input to capture a frame) having a second zoom level different from the first zoom level. For instance, image 310 can be a wide-angle image preview frame and image 320 can be a telephoto image preview frame. In some aspects, the composite image 330 can be a composite image preview frame that includes at least a portion of the first image preview frame 310 at the first zoom level and includes at least a portion of the second image preview frame 320 at the second zoom level.

In some examples, the composite image 330 is a composite image preview frame (e.g., image preview data) that is outputted to and/or displayed as image preview data of an image capture user interface (UI). For instance, the composite image 330 can be a composite image preview frame displayed using an image capture UI of an image capture device or other electronic device (e.g., smartphone, etc.). The composite image preview frame can be generated and/or outputted prior to receiving an input to capture a frame. In some cases, the composite image 330 can be a live preview (e.g., image preview data) that is output prior to receiving a command to capture an image (e.g., receiving an image capture trigger, etc.). For example, the composite image 330 can be image preview data (e.g., comprising a plurality of composite image preview frames) that is output prior to receiving a command to capture an image where the command corresponds to a user input to a shutter button of the image capture UI. The captured composite image frame can be generated (e.g., captured) based on receiving the user input indicative of the command to capture the image (e.g., user input to the shutter button of the image capture UI). The captured composite image frame can be generated based on one or more of the corresponding composite image preview frames.

As noted previously above, image preview data can be provided on a display of an image capture device while trying to capture a scene. In some examples, the image preview data can be obtained after raw sensor data (e.g., collected by the image capturing device's sensors) has undergone various pre-processing stages such as demosaicing, denoising, etc. In some aspects, the systems and techniques described herein can be included in and/or implemented as one or more pre-processing stages of an image preview data pipeline. For example, one or more (or all) of the processing blocks 510, 520, 530, 540, 550, and/or 560 of FIG. 5 can be used to generate an image preview data with zoom segmentation applied to increase or decrease a zoom level of a foreground portion of an image relative to a zoom level of a background portion of the image.

In one illustrative example, the image preview data of the composite image (e.g., composite image preview frame(s)) can change and be updated based on one or more user inputs to adjust the composition of the composite image that is being previewed prior to capture. For instance, the image preview data of the composite image can change based on user inputs to increase or decrease a zoom level of a foreground portion or foreground object(s) relative to a main zoom level of the image (e.g., a background portion zoom level, etc.). The image preview data of the composite image can change based on user inputs to increase or decrease a zoom level of one or more background objects relative to the main zoom level of the image and/or relative to an adjusted foreground object zoom level. The image preview data of the composite image may also change based on user inputs to translate or reposition one or more objects (e.g., foreground objects and/or background objects, at the main zoom level and/or at respective adjusted zoom levels) within the composite image preview frame.

When the image preview data of the composite image meets the user's expectation, the user can select a UI element corresponding to a command to capture an image, and image capture data can be obtained for the captured composite image frame from one or more cameras of the user's image capture device. The image capture data from each camera can be stored in the device storage of the user's image capture device. In some aspects, the image preview data of the composite frame, just before receiving the command to capture an image, can be similar to the captured composite image frame. The captured composite image frame can be a higher visual quality image than the composite image preview frame, as the composite image preview frame is generated in real-time for output on the display of the user's image capture device (e.g., to guide or assist in composition of the image and the subsequent capture of the desired composite image), whereas the captured composite image frame can be processed without the real-time latency constraint or requirement. In some aspects, the captured composite image frame can undergo a processing pipeline that is the same as or similar to the processing pipeline for generating the composite image preview frame (e.g., the image processing system 500 of FIG. 5). In some examples, the captured composite image frame can be generated using larger machine learning models that include a greater number of parameters, layers, etc. than those used to generate the composite image preview frames. For example, segmented foreground objects determined from the captured image data for generating the composite image capture may be more accurate than the same segmented foreground objects as represented in the composite image preview frame(s). In another example, inpainted regions determined while generating the composite image capture may have fewer artifacts than the same inpainted regions as represented in and generated for the composite image preview frame(s).

Figure 5:
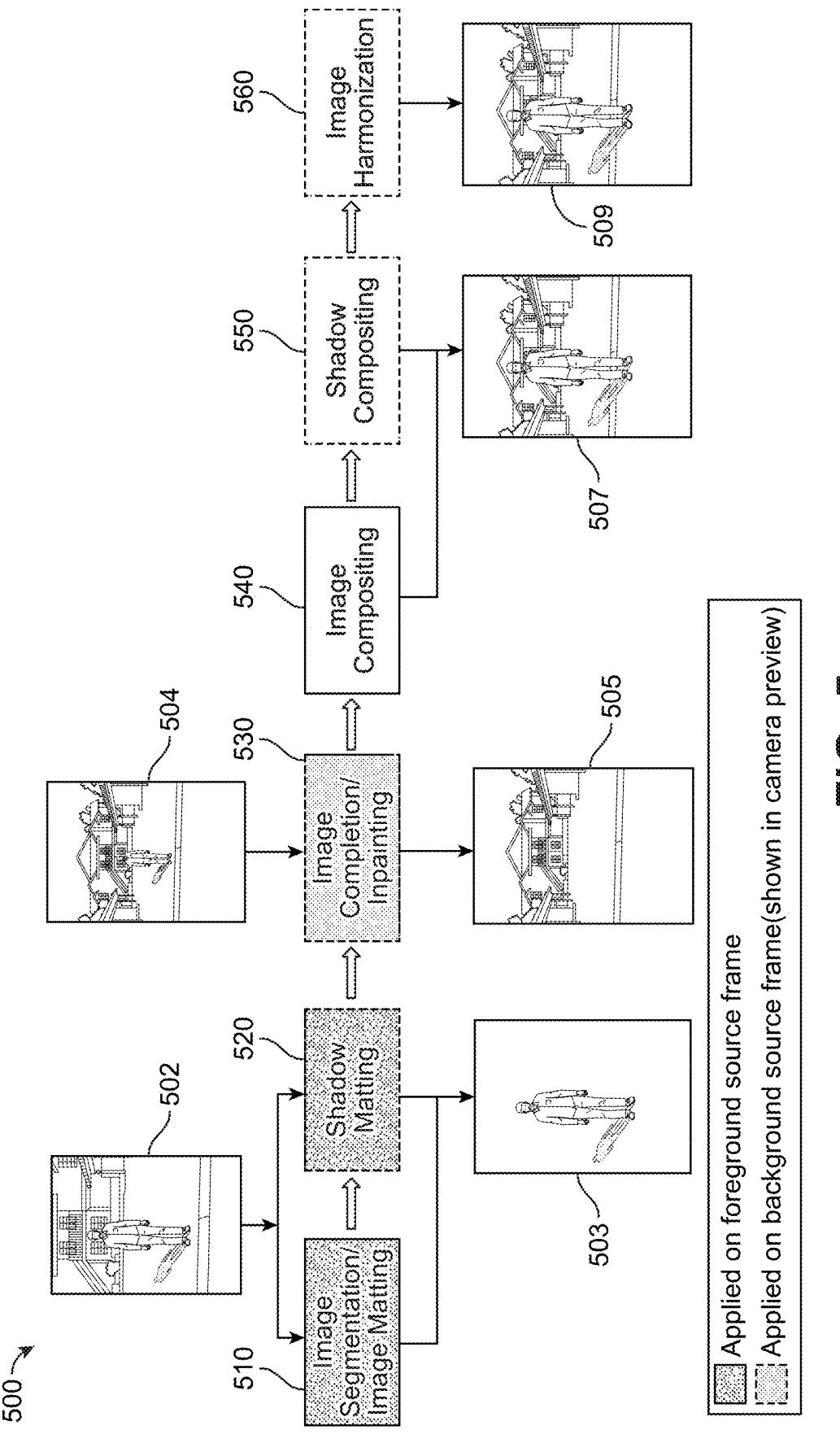
FIG. 5 is a diagram illustrating an example image processing system for performing composite image generation based on segmentation of multiple camera image frames, in accordance with some examples.

In some cases, differences in visual image quality between the composite image previews and the composite image captures can be based on the respective machine learning models used to perform various operations of the composite image generation processing pipeline (e.g., respective machine learning models and/or engines included in image processing system 500 of FIG. 5). For instance, composite image preview frames can be generated using relatively lightweight implementations of machine learning models corresponding to one or more of the image processing operations 510, 520, 530, 540, 550, and/or 560 of FIG. 5. Composite image preview frames can be generated using relatively strong or heavyweight implementations of machine learning models corresponding to one or more of the image processing operations 510, 520, 530, 540, 550, and/or 560 of FIG. 5. In some aspects, composite image preview frames and composite image capture frames can be generated using the same machine learning model(s) for one or more (or all) of the image processing operations 510, 520, 530, 540, 550, and/or 560 of FIG. 5.

In some cases, the composite image preview frame(s) can be generated based on lower quality segmentation maps generated by an image segmentation engine (e.g., image segmentation engine 510 of FIG. 5) and the composite image capture frames can be generated based on higher quality segmentation maps generated by an image segmentation engine (e.g., image segmentation engine 510 of FIG. 5). In some examples, the composite image preview frame(s) can be generated based on relatively lightweight inpainting techniques implemented by an image completion and inpainting engine (e.g., image completion and inpainting engine 530 of FIG. 5) and the composite image capture frame(s) can be generated based on relatively heavyweight inpainting techniques implemented by an image completion and inpainting engine (e.g., image completion and inpainting engine 530 of FIG. 5). In some cases, the composite image preview frame(s) can be generated based on overlay composition of segmented foreground objects with a second zoom level on the background image portion with the first zoom level, and the composite image capture frame(s) can be generated based on the higher quality segmentation map, and larger ML model implementations of one or more (or all) of image compositing engine 540, shadow compositing engine 550, and/or image harmonization engine 560 of FIG. 5.

Figure 3B:
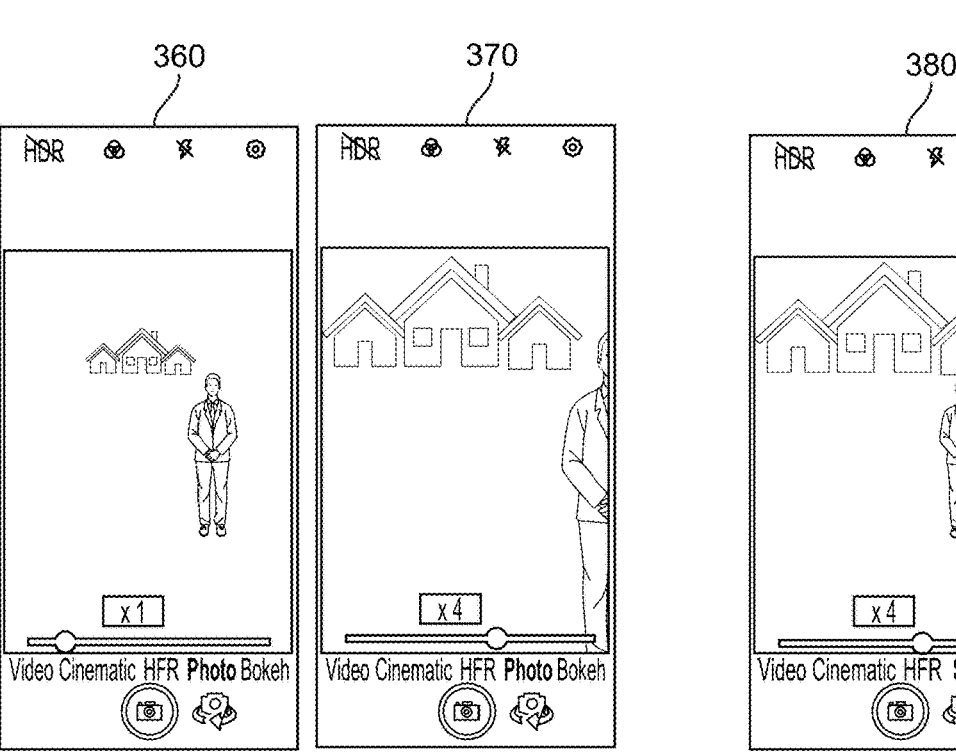
FIG. 3B illustrates an example of a composite image generated based on obtaining foreground information from a first image captured at a first zoom level and obtaining background information from a second image captured at a second zoom level that is greater than the first zoom level, in accordance with some examples.

FIG. 3B illustrates another example of composite image generation where a composite image 380 is generated based on obtaining foreground information from a first image 360 captured at a first zoom level and obtaining background information from a second image 370 captured at a second zoom level that is greater than the first zoom level. For instance, the example composite image generation of FIG. 3B can correspond to a scenario where a person (e.g., a foreground subject) is standing very far from a tall building (e.g., a background object). In this scenario, image 360 is a wide-angle image obtained using a 1× zoom level and image 370 is a telephoto image obtained using a 3× zoom level. The wide-angle image 360 can be obtained using a first camera and the telephoto image 370 can be obtained using a second camera. The systems and techniques described herein can be used to generate the composite image 380 to include foreground information of the person corresponding to the wide-angle image 360 and background information of the house corresponding to the telephoto image 370.

In some examples, image 360 can be a first image preview frame (e.g., a first frame outputted prior to receiving an input to capture a frame) having a first zoom level, and image 370 can be a second image preview frame (e.g., a second frame outputted prior to receiving an input to capture a frame) having a second zoom level different from the first zoom level. For instance, image 360 can be a wide-angle image preview frame and image 370 can be a telephoto image preview frame. In some aspects, the composite image 380 can be a composite image preview frame that includes at least a portion of the first image preview frame 360 at the first zoom level and includes at least a portion of the second image preview frame 370 at the second zoom level.

In some examples, the composite image 380 is a composite image preview frame that is outputted to and/or displayed as image preview data of an image capture user interface (UI) (e.g., a composite frame outputted prior to receiving an input to capture a frame). For instance, the composite image 380 can be a composite image preview frame displayed using an image capture UI of an image capture device or other electronic device (e.g., smartphone, etc.). In some cases, the composite image 380 can be an image preview data (e.g., live preview) that is output prior to receiving a command to capture an image (e.g., an image capture trigger, etc.). For example, the composite image 380 can be an image preview data (e.g., comprising a plurality of composite image preview frames) that is output prior to receiving a command to capture an image where the command corresponds to a user input to a shutter button of the image capture UI. The captured composite image frame can be generated (e.g., captured) based on receiving the user input indicative of the command to capture an image (e.g., user input to the shutter button of the image capture UI). The captured composite image frame can be generated based on one or more of the corresponding composite image preview frames.

In some aspects, the same image capture UI can be used to generate and/or display the composite image preview frame 330 of FIG. 3A (e.g., including a background portion associated with a wide-angle image preview frame and a foreground portion associated with a telephoto image preview frame) and the composite image preview frame 380 of FIG. 3B (e.g., including a background portion associated with a telephoto image preview frame and a foreground portion associated with a wide-angle image preview frame).

Figure 4:
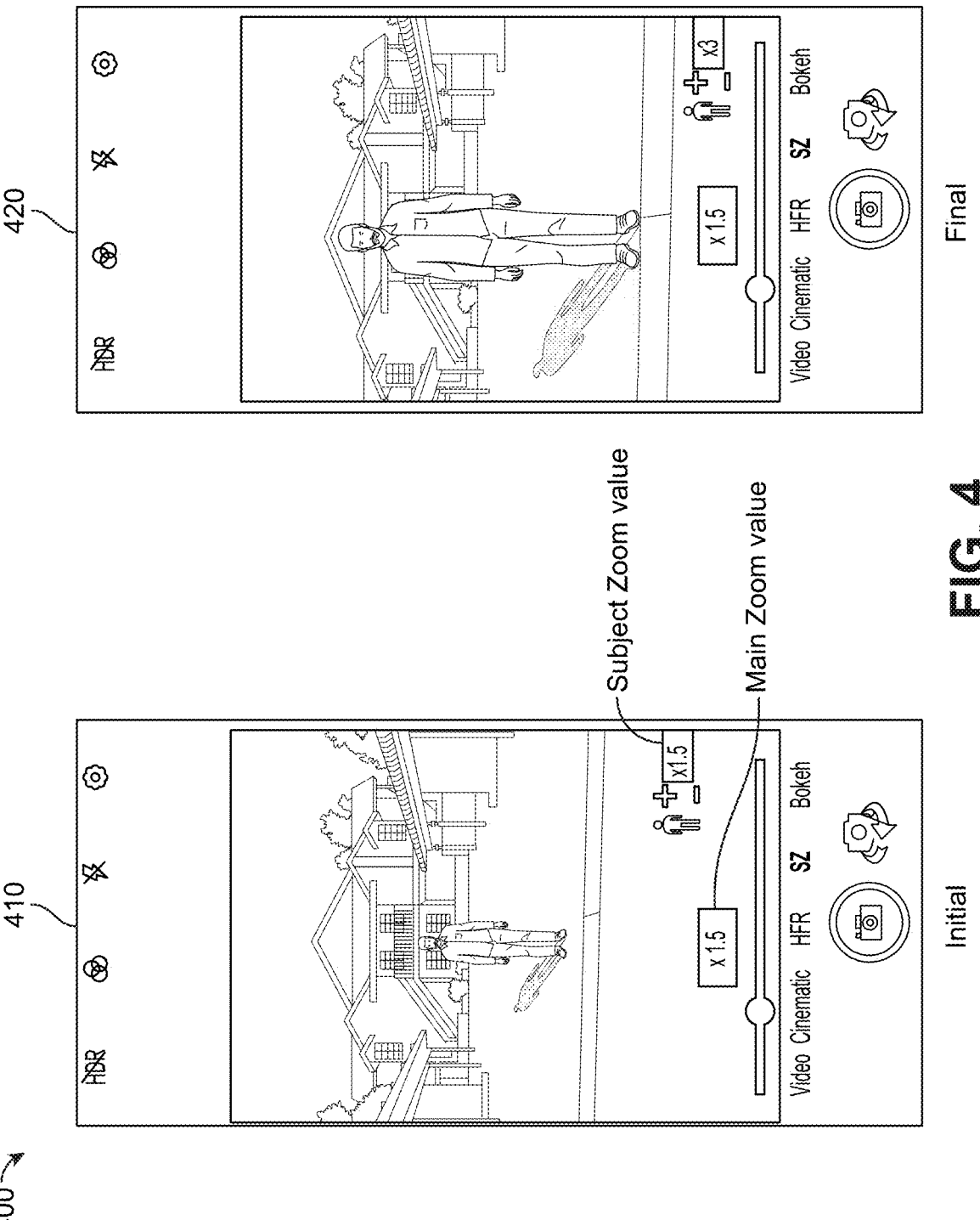
FIG. 4 illustrates an example of an image capture preview user interface (UI) that includes at least two zoom adjustment features for adjusting a composite image in the image capture preview UI, in accordance with some examples.

FIG. 4 illustrates an example of an image capture preview user interface (UI) 400 that includes at least two zoom adjustment features for adjusting a composite image in the image capture preview UI, in accordance with some examples. For instance, the image capture preview UI can include first and second zoom adjustment features (e.g., also referred to as respective first and second graphical user interface (GUI) elements) for adjusting a composite image preview frame (e.g., a composite frame outputted prior to receiving an input to capture a frame) displayed in the image capture preview UI. In some cases, the UI 400 can correspond to a segmentation zoom (e.g., "SZ") mode or feature of a camera application or GUI of a smartphone or other mobile computing device. In one illustrative example, the segmentation zoom UI can include a first zoom adjustment feature (e.g., a first GUI or first GUI element) that can receive user input(s) for increasing or decreasing a primary zoom value of the composite image preview frame depicted in the UI 400. For instance, the first zoom adjustment feature (e.g., first GUI or first GUI element) can be used to adjust a main zoom value corresponding to the composite image preview frame. In the example UI 410 of FIG. 4, the main zoom value is shown as adjusted to a 1.5× zoom level.

The segmentation zoom UI 400 can include a second zoom adjustment feature (e.g., a second GUI or second GUI element) that can receive user input(s) for increasing or decreasing a zoom value of a segmented object within the composite image preview frame. In one illustrative example, the segmented object can be a foreground object or a background object. For instance, the segmented object can be a person (e.g., a foreground object) within the main image preview. In the example UI 410 and the example UI 420, the second zoom adjustment feature (e.g., second GUI element) corresponds to a "Person Zoom value." The example UI 410 corresponds to an initial state where the person zoom value and the main zoom value are equal (e.g., both set to a 1.5× zoom level). In the initial state corresponding to UI 410, the image preview can be captured using a single camera having a 1.5× zoom level.

In a final state corresponding to the example UI 420, the person zoom value is adjusted to a different zoom level than the 1.5× zoom level of the main image. For instance, example UI 420 shows the person zoom value adjusted to a zoom level of 3×. As will be described in greater detail below, increasing or decreasing the person zoom value can cause the systems and techniques to segment and remove the person from the image captured using the main zoom value (e.g., the image previewed in UI 410), and generate a composite image using segmented image data of the person from an image captured using the person zoom value (e.g., the image previewed in UI 420). As noted previously above, generating the composite image can include generating a composite image preview frame (e.g., a first frame outputted prior to receiving an input to capture a frame) and/or generating (e.g., capturing) a composite image frame corresponding to one or more composite image preview frames (e.g., a captured frame outputted subsequent to the first frame and subsequent to receiving an input to capture a frame).

FIG. 5 is a diagram illustrating an example image processing system 500 for performing composite image generation based on segmentation of multiple camera image frames, in accordance with some examples. In some aspects, the multiple camera image frames can be obtained from at least a first camera having a first focal length and a second camera having a second focal length. In some cases, the multiple camera image frames can be frames that are obtained prior to receiving an input to capture an image. For instance, the multiple camera image frames can be preview frames that are obtained and/or output prior to receiving an input to capture an image. In some examples, the multiple camera image frames can be frames that are obtained subsequent to and/or based on receiving the input to capture an image. For instance, the multiple camera image frames can be captured frames. A captured frame obtained subsequent to an input to capture an image can correspond to a first frame obtained prior to the input to capture an image (e.g., a captured frame can correspond to a preview frame).

A foreground source frame 502 can be obtained using a first camera and using a first zoom level (e.g., first focal length). A background source frame 504 can be obtained using a second camera and using a second zoom level (e.g., second focal length). The first and second cameras can be different from one another. In one illustrative example, the first and second cameras are included on the same computing device (e.g., image capture device, etc.). The first and second zoom levels (e.g., first and second focal lengths) can be different from one another. Image preview data (e.g., image frames outputted prior to receiving an input to capture an image) corresponding to the foreground source frame 502 and background source frame 504 can be obtained based at least in part on one or more user inputs to the example segmentation zoom UI 400 of FIG. 4. For instance, the foreground source frame 502 and background source frame 504 can be obtained based on user input(s) to the main zoom level and person zoom level values depicted in FIG. 4.

In some cases, a first GUI or first GUI element can be used to receive an adjustment to a foreground object zoom level, and a second GUI or second GUI element can be used to receive an adjustment to a background object zoom level and/or a main zoom level. In some aspects, the second GUI element can be used to receive an adjustment to a main zoom level, and a third GUI element can be used to receive an adjustment to a background object zoom level. In some examples, one or more GUI elements for receiving a user input indicative of a zoom level adjustment can be overlayed on (e.g., over or on top of) the composite image preview frames (e.g., frames obtained prior to receiving an input to capture an image) generated using the systems and techniques described herein. For instance, an image capture preview interface can include a composite image preview frame and one or more zoom level adjustment GUIs overlaid on top of the composite image preview frame. In some cases, the generated composite image preview frame can include the one or more GUI elements. In some examples, the generated composite image preview frame is separate from respective overlay data associated with rendering or displaying the respective GUI elements of the one or more GUI elements associated with zoom level adjustment(s).

In some cases, one or more of the GUI elements associated with zoom level adjustments can be collapsible. For instance, the "Main Zoom value" of FIG. 4 may be a GUI overlay element displayed by default in combination with a composite image preview frame, and the "Person Zoom value" of FIG. 4 may be a GUI overlay element configured to be collapsible based on one or more additional user inputs. For instance, an additional user input may be received and used to begin displaying the "Person Zoom value" GUI overlay element. In this example, a default state of the "Person Zoom value" may be a collapsed state where the "Person Zoom value" GUI overlay element is not displayed by the image capture preview UI, unless a particular user input is received indicative of a request to begin displaying the "Person Zoom value" GUI overlay element on top of the composite image preview frame(s). In another example, the "Person Zoom value" GUI overlay element may be displayed by default as an overlay on top of the composite image preview frame(s), and an additional user input may be received indicative of a request to collapse the "Person Zoom value" GUI overlay element. In such examples, the additional user input can cause the image capture preview UI to remove the "Person Zoom value" GUI overlay element from on top of the composite image preview frame(s) being displayed to the user.

In one illustrative example, the background source frame 504 is shown as a live (e.g., real-time) preview (e.g., a frame outputted prior to receiving an input to capture an image) in an image capture preview interface, such as the example UI 400 of FIG. 4. The background source frame 504 can correspond to the "Main Zoom value" of FIG. 4. The foreground source frame 502 can be composited onto the background source frame 504, where the composite image based on foreground source frame 502 and background source frame 504 is shown as a live (e.g., real-time) preview in the image capture preview interface (e.g., a composite frame outputted prior to receiving an input to capture a composite image). For example, the relative size of the segmented foreground object 503 can be increased or decreased using the "Person Zoom value" of FIG. 4. In some aspects, the background source frame 504 can be an image preview frame (e.g., a frame outputted prior to receiving an input to capture an image) captured using a first camera and a first zoom level (e.g., first focal length), and the foreground source frame 502 can be an image preview frame (e.g., a frame outputted prior to receiving an input to capture an image) captured using a second camera and a second zoom level. The first camera and second camera can be different from one another. The first zoom level and the second zoom level can be different from one another. In some aspects, the background source frame 504 and foreground source frame 502 can include respective image data corresponding to the same scene and/or objects. For instance, the foreground source frame 502 can include some (or all) of the portion of the scene and scene objects included in the background source frame 504 (e.g., in examples where the foreground source frame has a wider zoom level than the background source frame, the background source frame can depict a subset or portion of the scene in the foreground source frame). In another example, the background source frame 504 can include some (or all) of the portion of the scene and scene objects included in the foreground source frame 502 (e.g., in examples where the background source frame has a wider zoom level than the foreground source frame, the foreground source frame can depict a subset or portion of the scene in the background source frame).

As the relative size of the segmented foreground object 503 is increased or decreased, the systems and techniques can update the composite image preview displayed in the segmentation zoom image capture preview interface. In some aspects, as the relative size of the segmented foreground object 503 is increased or decreased, the particular camera or focal length used to obtain the foreground source frame 502 can be updated. For instance, increasing the relative size of the segmented foreground object 503 can cause the systems and techniques to obtain the segmented foreground object 503 image data from a camera having a greater zoom level (e.g., longer focal length). In some aspects, if an additional camera with a greater zoom level (longer focal length) is not available, the segmentation zoom UI may remove the UI feature for increasing the person zoom level. In another example, if an additional camera with a greater zoom level (longer focal length) is not available, the segmentation zoom UI can perform digital zooming (e.g., cropping) of the image preview data (e.g., image frames outputted prior to receiving an input to capture an image) captured using the longest focal length camera that is available.

Decreasing the relative size of the segmented foreground object 503 can cause the systems and techniques to obtain the segmented foreground object 503 image data from a camera having a smaller zoom level (e.g., shorter focal length). For instance, if the background source frame 504 is captured using a 1× zoom level, the foreground source frame 502 shown in FIG. 5 may corresponding to a telephoto 3× zoom level. If the relative size of the segmented foreground object 503 is decreased (e.g., if the "Person Zoom value" of FIG. 4), in some aspects the foreground source frame 502 image data can be updated to be obtained as image preview data (e.g., an image frame outputted prior to receiving an input to capture an image) captured using a wide-angle camera with a 0.5× zoom level (or other zoom level less than the 1× main zoom level corresponding to the background source frame 504 image data).

In some aspects, the foreground source frame 502 image preview data (e.g., image frames outputted prior to receiving an input to capture an image)) can be provided to an image segmentation and/or image matting engine 510 that can be used to generate a segmented foreground object image data 503. The segmented foreground object image data can also be referred to as a "segmented foreground object result" and/or a "segmented person result." The zoom level of the segmented foreground object result 503 is the same as the zoom level of the foreground source frame 502 (e.g., the same as the "Person Zoom level" of FIG. 4). For instance, the zoom level of the foreground source frame 502 can be 3× and the zoom level of the segmented foreground object result 503 can be 3×. In some aspects, a shadow matting engine 520 can be additionally used to generate the segmented foreground object result 503. The segmented foreground object result 503 can also be referred to as a segmented person result (e.g., in an example where the foreground object to be segmented is a person).

Further details of the segmented person result 503 are described below with respect to FIG. 6 (e.g., the segmented person result 650 of FIG. 6 can be the same as the segmented person result 503 of FIG. 5). Further details of the shadow matting and/or shadowing matting engine 520 of FIG. 5 are described below with respect to FIGS. 15A-D. In some aspects, the systems and techniques can generate the segmented foreground object result 503 without using the shadowing matting engine 520.

In some examples, the background source frame 504 image preview data (e.g., image frames outputted prior to receiving an input to capture an image) can be provided to an image completion and/or inpainting engine 530 that can be used to generate a background only image data 505. The background only image data can also be referred to as a "background only result." The zoom level of the background only result can be the same as the zoom level of the background source frame 504 (e.g., the same as the "Main Zoom level" of FIG. 4). For instance, the zoom level of the background source frame 504 can be 1× and the zoom level of the background only result 505 can be 1×. In some aspects, the systems and techniques can generate the background only result 505 without using the image completion and/or inpainting engine 530.

Further details of the background only result 505 are described below with respect to FIG. 7). Further details of the image completion and/or inpainting engine 530 are described below with respect to FIG. 7 and FIG. 16.

In one illustrative example, an image compositing engine 540 can generate a composite image 507 based on combining the segmented foreground object result 503 and the background only result 505. For example, the segmented foreground object result 503 can be added to the background only result 505 to obtain the composite image 507. Further details of the composite image generation are described below with respect to FIG. 8 (e.g., the composite image 850 of FIGS. 8 and 9 can be the same as the composite image 507 of FIG. 5).

In some aspects, a shadow compositing engine 550 can be additionally used to perform shadow compositing to generate more realistic shadow information in the composite image 507. Further details of shadow compositing are described below with respect to FIGS. 15A-D.

In some aspects, an image harmonization engine 560 can be used to generate an adjusted composite image 509, based on performing one or more image harmonization processes to match the white balance, color profiles, color tones, etc., of the segmented foreground object result 503 image data and the background only result 505 image data (e.g., which are obtained using two separate cameras that may use different sensors, image capture parameters, etc.).

Figure 6:
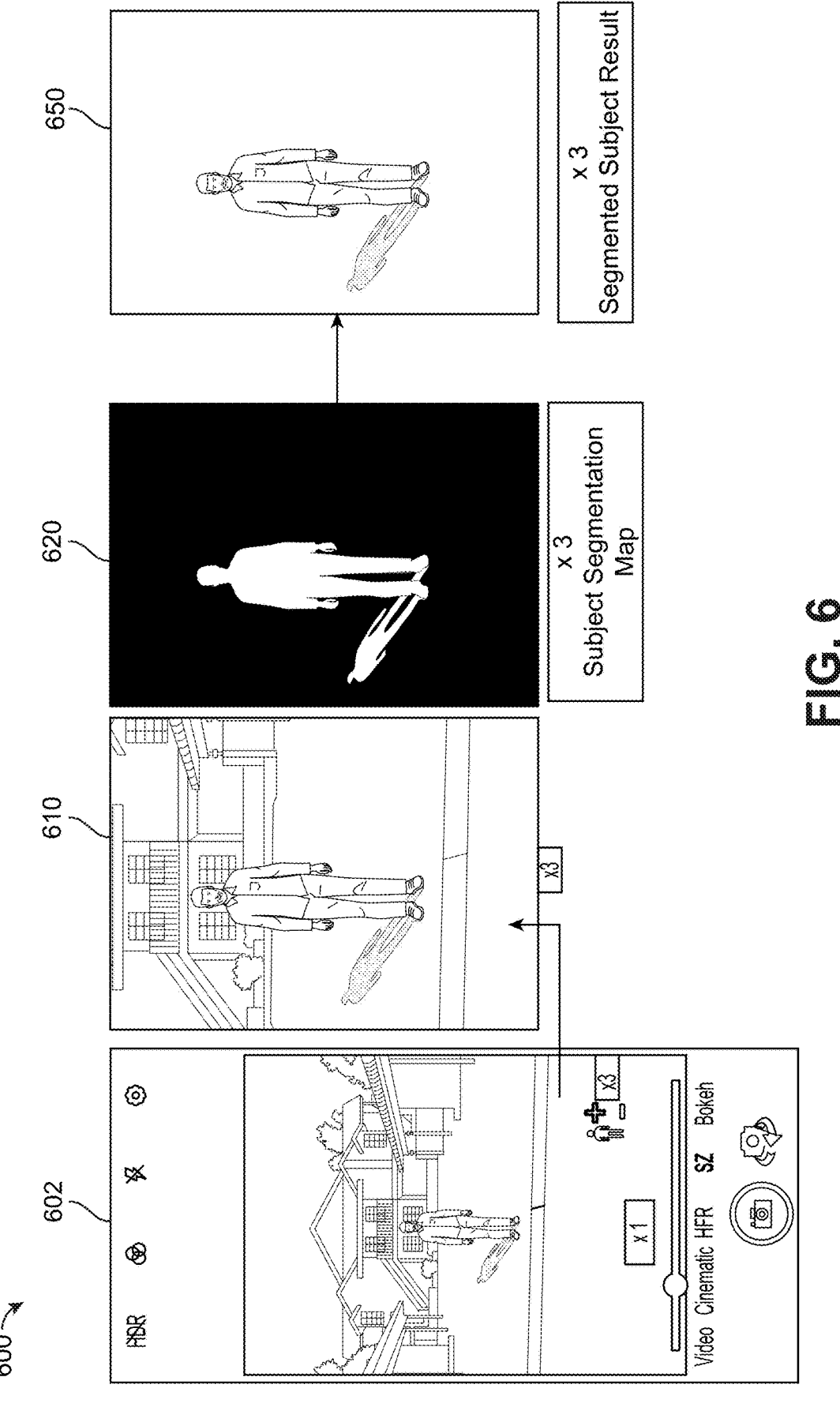
FIG. 6 illustrates an example of person or object segmentation from the foreground of a telephoto image frame, in accordance with some examples.

FIG. 6 illustrates an example of person or object segmentation 600 from the foreground of a telephoto image frame, in accordance with some examples. In some aspects, the segmentation zoom UI 602 can be the same as or similar to the segmentation zoom UI 400 (and/or example UIs 410, 420) of FIG. 4. In the example of segmentation zoom UI 602, the main zoom level (e.g., zoom level of the background source frame 504 image data of FIG. 5) is set to 1× and the person zoom level (e.g., zoom level of the foreground source frame 502 image data of FIG. 5) is set to 3×.

In some aspects, the foreground source frame 502 image data of FIG. 5 can be the same as or similar to the foreground source frame 610 image data. The foreground source frame 610 can be obtained using a 3× zoom level telephoto camera. In some examples, based on the user of segmentation zoom UI 602 increasing the person zoom level to 3×, the 3× zoom telephoto image frame data 610 and its corresponding person segmentation map 620 can be obtained.

In one illustrative example, the 3× person segmentation map 620 can be generated using a segmentation machine learning network. The segmentation machine learning network can be implemented using the same smartphone, mobile computing device, image capture device, etc., that is used to obtain the foreground source frame 502 image data and background source frame 504 image data of FIG. 5. In some aspects, the 3× person segmentation map 620 can have the same pixel resolution of the 3× telephoto image data 610. Each pixel of the 3× person segmentation map 620 can include a value indicative of the corresponding pixel in the 3× telephoto image data 610 being included or not being included in the segmented person result. In some examples, the 3× person segmentation map 620 and the 3× segmented person result 650 can include only pixels of image data that correspond to the person. In other examples, the 3× person segmentation map 620 and the 3× segmented person result 650 can include pixels of image data that correspond to the person or that correspond to a shadow cast by the person. As illustrated in FIG. 6, the segmentation information includes the shadow of the person. As noted previously above, the 3× segmented person result 650 can be obtained by combining the 3× telephoto image data 610 and the 3× person segmentation map 620. For instance, in one illustrative example, the 3× segmented person result 650 can be obtained by multiplying the 3× telephoto image data 610 with the 3× person segmentation map 620. In some aspects, the 3× segmented person result 650 can be the same as or similar to the segmented person result 503 of FIG. 5.

Figure 7:
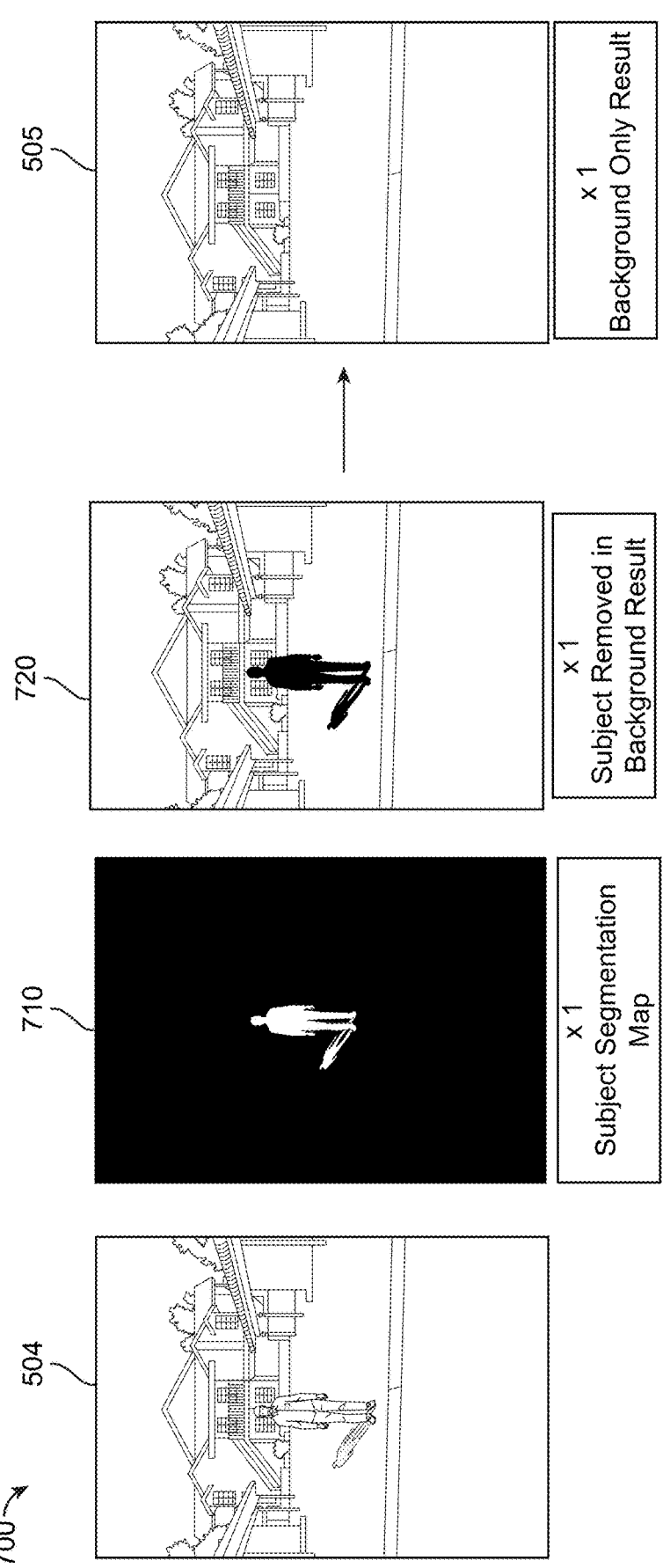
FIG. 7 illustrates an example of person or object removal from a foreground of a non-telephoto image frame, in accordance with some examples.

FIG. 7 illustrates an example of person or object removal 700 from a foreground of an image frame used as the background of a composite image, in accordance with some examples. In some aspects, FIG. 7 can be associated with a segmentation zoom UI that is the same as or similar to the segmentation zoom UI 602 of FIG. 6 and/or the segmentation zoom UI 400 (and example UIs 410, 420) of FIG. 4. In the example of FIG. 7, the main zoom level of the segmentation zoom UI can be set to 1× and the person zoom level can be set to 3×, as described above with respect to the segmentation zoom UI 602 of FIG. 6.

In some aspects, the example foreground portion removal (e.g., person or object removal 700) of FIG. 7 can be performed using the background source frame 504 image data of FIG. 5, and may be obtained using a 1× zoom level camera included on the same device as the 3× telephoto camera used to capture the foreground source frame 502 image data of FIG. 5 (e.g., the foreground source frame 610 image data of FIG. 6).

In one illustrative example, using one or more machine learning (ML) and/or artificial intelligence (AI) models, image data corresponding to the foreground portion of interest (e.g., the person or other foreground object or subject that was segmented out of the foreground frame 502 of FIG. 5) can be removed from the background source frame 504 image data. For instance, the one or more ML and/or AI models can be used to generate a 1× zoom level person removed result 720 based on removing the person (e.g., foreground object) from the 1× background image data 504. In some cases, the person can be removed from the 1× background image data using the same segmentation machine learning model that was used to generate the 3× person segmentation map 620 and the 3× segmented person result 650 of FIG. 6. For instance, the one or more ML and/or AI models can be used to generate a 1× person segmentation map 710 that can be combined with the background source frame 504 image data to generate a 1× subject removed in background result 720. In one illustrative example, the 1× person segmentation map 710 can be generated using the image matting/image segmentation engine 510 of FIG. 5 to generate the mask of the foreground object that will be removed from background source frame 504 (e.g., the 1× person segmentation map of FIG. 7). Using 1× person segmentation map 710, the foreground portion of the background source frame 504 is removed to generate the 1× person removed result 720, which includes a missing region (e.g., a region without pixel data) corresponding to the 1× person segmentation map 710. The missing or empty region of the 1× person removed result 720 can be filled using the image completion and inpainting engine 530 of FIG. 5, to generate the 1× background only result 505. For example, the image completion and/or inpainting engine 530 of FIG. 5 can be used to generate image data for the missing portion of image data in the 1× person removed result 720 based on generating pixel data to fill the negative space corresponding to the removed person in the 1× background image based on analyzing pixel information, semantic information, etc., of neighboring pixels that were not removed in 1× person removed result 720 and/or based on analyzing pixel information, semantic information, etc., of the 1× background image 504 as a whole.

In some examples, the zoom level of the 1× background only result 505 can be the same as the zoom level of the 1× background source frame 504 (e.g., the same as the "Main Zoom level" of FIG. 4). For instance, the zoom level of the background source frame 504 can be 1× and the zoom level of the background only result 505 can be 1×. In some aspects, the systems and techniques can skip generating the 1× background only result 505 by not making use of the image completion and/or inpainting engine 530. For instance, the 1× background source frame 504 can be provided directly to the image compositing engine 540 of FIG. 5 as input, along with the segmented foreground object result 503 of FIG. 5.

Figure 8:
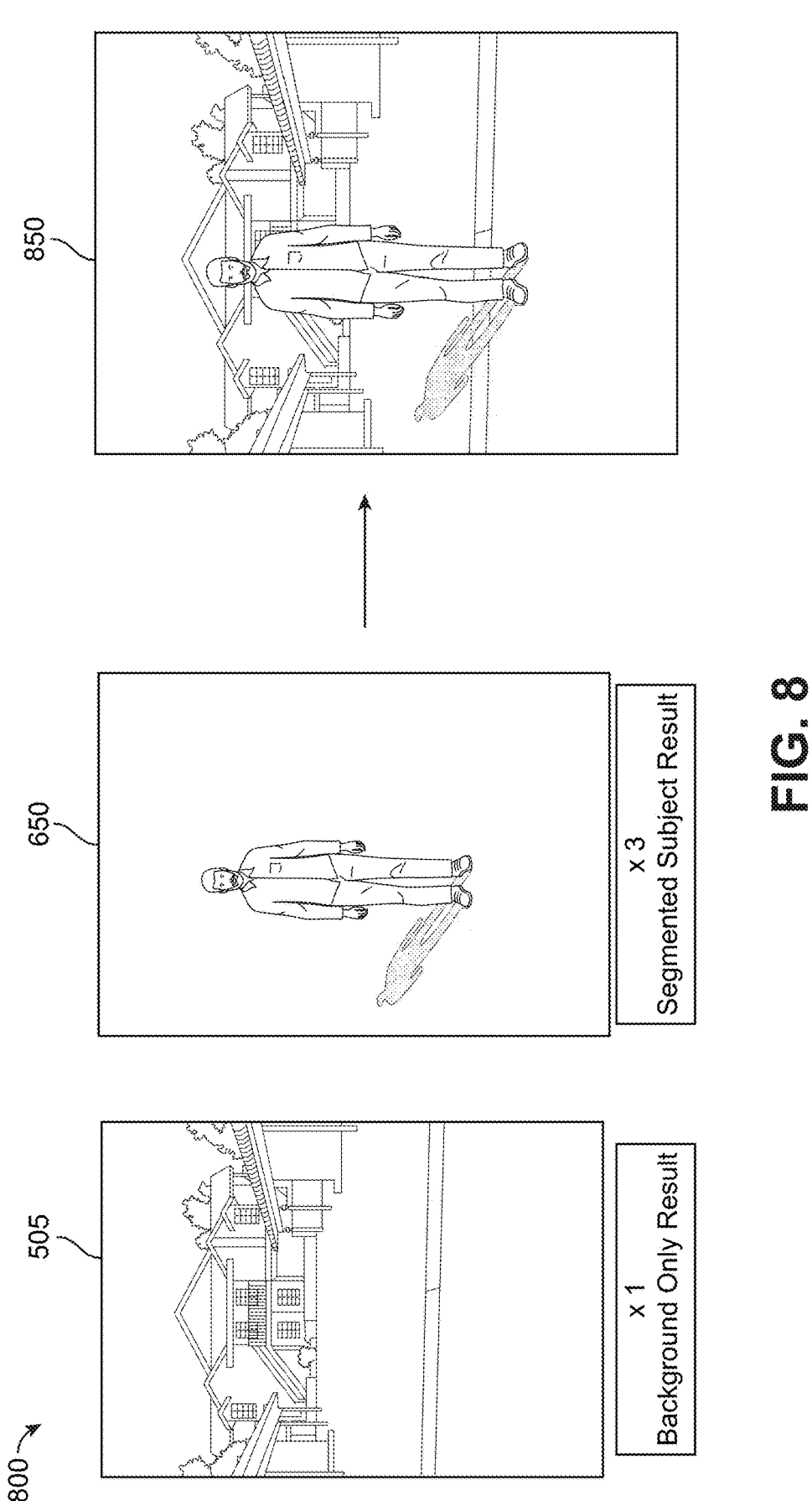
FIG. 8 illustrates an example of a composite image generated using foreground information based on the person segmentation of FIG. 6 and using background information based on the person removal of FIG. 7, in accordance with some examples.

FIG. 8 illustrates an example of composite image generation 800. For instance, a composite image 850 can be generated using foreground information based on the person segmentation of FIG. 6 and using background information based on the person removal of FIG. 7, in accordance with some examples. In one illustrative example, the composite image 850 can be generated based on adding the 1× background only result 505 of FIG. 5 and FIG. 7 with the 3× segmented person result 650 of FIG. 6. As noted previously, the composite image 850 can be the same as or similar to the composite image 507 of FIG. 5. By adding the 1× background only result 505 and the 3× segmented person result 650, the composite image 850 is generated to include the 3× telephoto view of the person (e.g., foreground object) in the 1× wide frame view of the background scene. In some aspects, the composite image 850 and/or composite image generation 800 of FIG. 8 can be generated and/or performed (respectively) using the image compositing engine 540 of FIG. 5 and/or the shadow compositing engine 550 of FIG. 5.

FIG. 9 illustrates an example of an image capture preview UI 900 that can be used to preview the composite image 850 of FIG. 8 prior to receiving a command to capture an image (e.g., an image capture trigger or image capture user input, etc.), in accordance with some examples. For instance, the composite image 850 can be output and/or displayed prior to receiving the command to capture an image in the image capture preview UI 900. For instance, one or more composite image preview frames can be generated and displayed in the image capture preview UI 900, based on respective image preview frames corresponding to a foreground source preview frame and a background source preview frame. The composite image 850 can be a composite image frame that is generated (e.g., captured) based on receiving the command to capture an image. In some aspects, the captured composite image frame can correspond to a composite image preview frame displayed in the image capture preview UI 900 at the time of receiving the command to capture an image. In another example, the composite image 850 can be a composite image preview frame displayed in the image capture preview UI 900. In some aspects, the image capture preview UI 900 of FIG. 9 can be the same as or similar to one or more of the segmentation UI 400 of FIG. 4, and/or the segmentation UI 602 of FIG. 6.

In an initial segmentation UI view 910, the image preview area displayed corresponds to the 1× zoom level image of the scene (e.g., both the foreground object (e.g., person) and the background object (e.g., house)) are shown at the same 1× zoom level, using image preview data (e.g., image frames outputted prior to receiving an input to capture an image) obtained from a 1× zoom wide-angle camera. Based on a user input increasing the zoom level of the person (e.g., increasing the "Person Zoom level" of FIG. 4) to a 3× zoom level, the composite image 850 is previewed in the image preview area of the segmentation UI, as depicted in the final segmentation UI view 950. In one illustrative example, the previewed composite image 850 displayed in the segmentation UI view 950 is generated in real-time using image preview frames corresponding to the 1× background frame and the 3× telephoto foreground frame. The image preview frames can be obtained as streaming image data from the 1× wide angle and 3× telephoto image sensors included in the computing device used to present the segmentation UI view 950 and the image capture preview UI 900.

In some aspects, the image capture preview UI 900 can include an image capture input element or other UI interface element for receiving a command to capture an image (e.g., triggering the capture of a composite image output, etc.). For instance, a user input selecting or actuating the image capture/shutter button of the segmentation UI view 950 can cause the systems and techniques to capture the 1× background frame and 3× telephoto foreground frame at full resolution, and generate a full-resolution composite image output corresponding to the composite image preview 850. In some examples, the 1× background frame image data and 3× telephoto frame image data may be captured in parallel (e.g., simultaneously). In some examples, the 1× background frame image data and the 3× telephoto frame image data may be captured sequentially.

Figure 10:
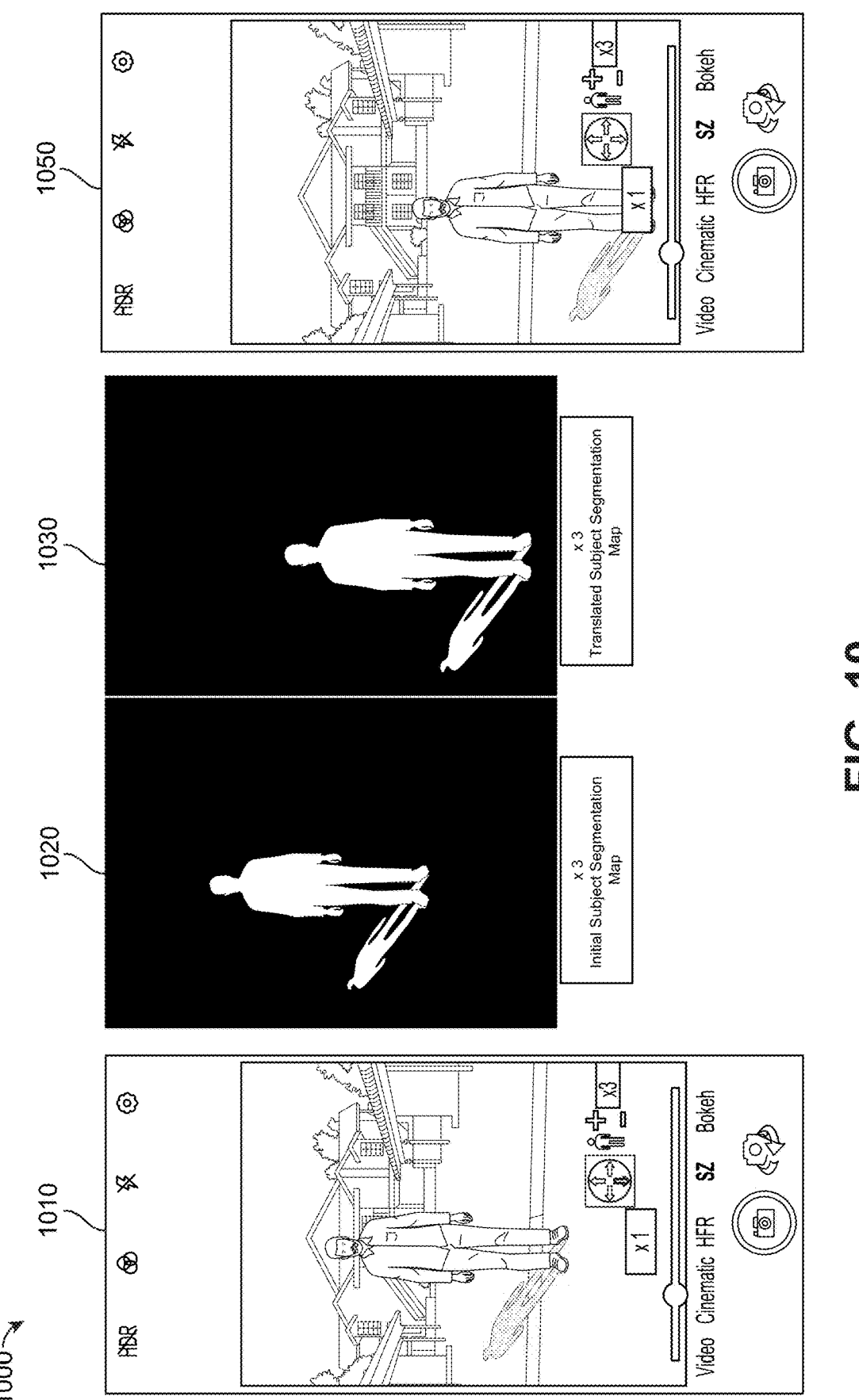
FIG. 10 illustrates an example of an image capture preview UI and foreground portion segmentation maps that can be used to compose and/or adjust a preview of a composite image with a foreground portion translated from a first location to a second location, in accordance with some examples.

FIG. 10 illustrates an example of foreground object repositioning 1000 using an image capture preview UI 1010 (e.g., segmentation zoom UI) that may be the same as or similar to one or more of the segmentation zoom UI 400 of FIG. 4, the segmentation zoom UI 602 of FIG. 6, and/or the segmentation zoom UI 900 of FIG. 9.

For instance, the segmentation zoom UI 1010 of FIG. 10 can include a main zoom level adjustment (e.g., shown here as set to a 1× zoom level) and a person zoom level adjustment (e.g., shown here as set to a 3× zoom level) as has been described previously. The segmentation zoom UI 1010 of FIG. 10 can additionally include a person (e.g., foreground object) translation adjustment UI element that can be used to translate or otherwise adjust the positioning of the segmented person within the composite image preview displayed in the segmentation zoom UI.

For instance, the segmentation zoom UI 1010 corresponds to an initial composite image preview without a translation adjustment applied to the segmented person. The initial composite image preview displayed by the segmentation zoom UI 1010 can be the same as or similar to the composite image preview 850 of FIGS. 8 and 9.

The user input to the translation adjustment UI element (e.g., corresponding to the example of FIG. 10 to an up arrow, a down arrow, a left arrow, and a right arrow) can be used to generate a 3× translated person segmentation map 1030 using the 3× initial person segmentation map 1020. The 3× initial person segmentation map 1020 can be the same as or similar to the 3× person segmentation map 620 of FIG. 6. In some aspects, based on which arrow is pressed in the translation adjustment UI element, the segmented person in the 3× initial person segmentation map 1020 is moved in the corresponding direction by padding and removing rows and/or columns appropriately. Based on the padding and removal of rows/columns, the 3× translated person segmentation map 1030 can be generated.

The 3× translated person segmentation map 1030 can be used to generate a translated composite image preview as depicted in the image preview area of segmentation zoom UI 1050. The translated composite image preview can be generated as described above with respect to generation of the non-translated composite image preview 850 of FIG. 8 (e.g., based on inverting the 3× translated person segmentation map 1030, multiplying with the 1× person removed result, and using the image compositing engine 540 of FIG. 5 to combine with the 3× segmented person result).

In one illustrative example, the systems and techniques described herein can be used to provide a segmentation zoom UI (e.g., also referred to as a dual zoom UI) that can be used to change or otherwise adjust the zoom level of the foreground and background of an image separately during an image preview stage (e.g., prior to final image capture based on receiving a command to capture an image, such as user selection of a camera or shutter button included in the segmentation zoom UI).

Figure 11:
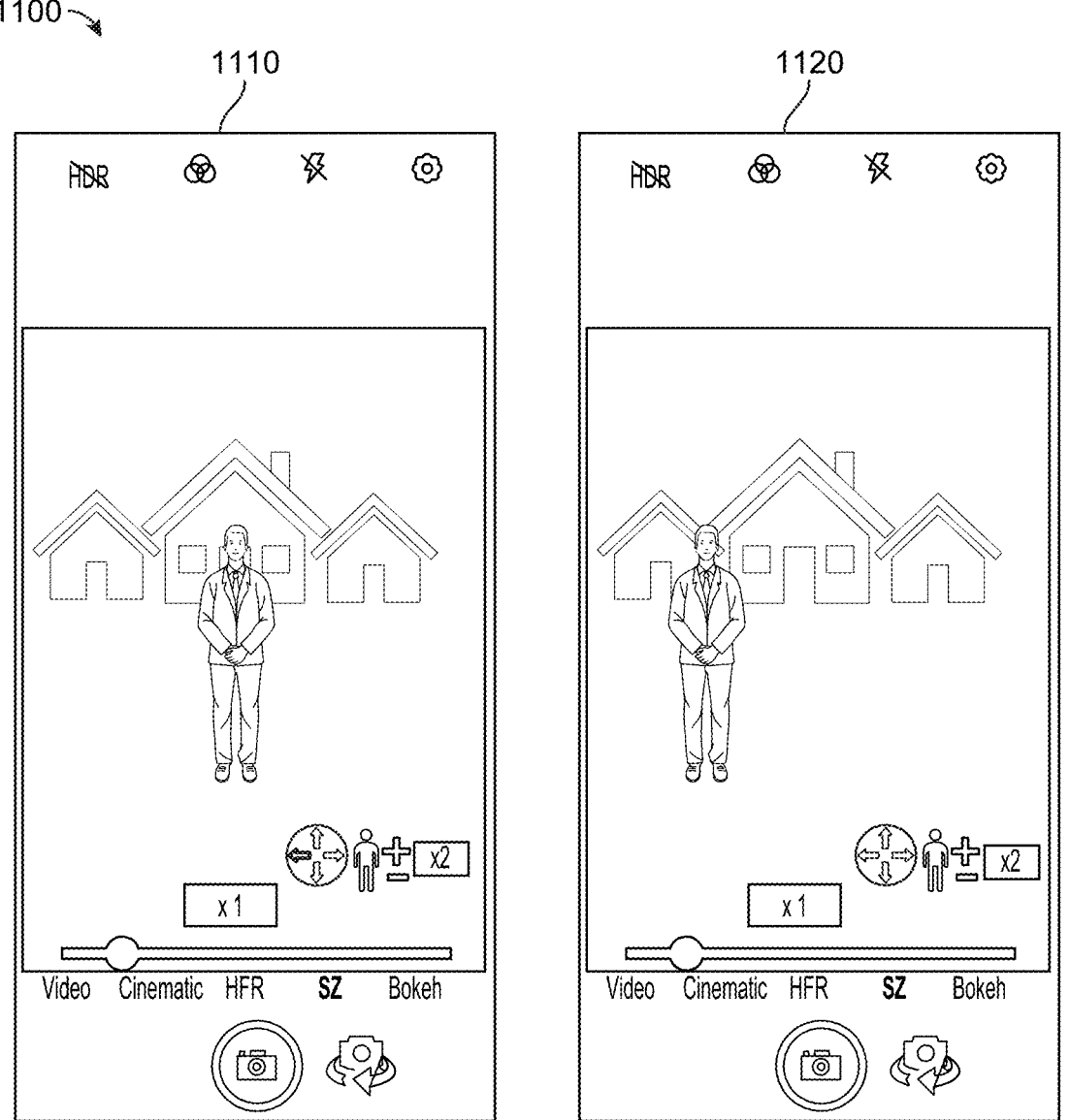
FIG. 11 illustrates another example of an image capture preview UI that can be used to compose and/or adjust a preview of a composite image, where the image capture preview UI includes a UI feature for adjusting a zoom level of a foreground portion and a UI feature for adjusting a translation or location of the foreground portion, in accordance with some examples.

FIG. 11 illustrates another example of an image capture preview UI 1100 that can be used to compose and/or adjust a preview of a composite image, where the image capture preview UI includes a UI feature for adjusting a zoom level of a foreground object and a UI feature for adjusting a translation or location of the foreground object, in accordance with some examples. The image capture preview UI 1100 can also be referred to as a segmentation zoom UI, and may be the same as or similar to the segmentation zoom UI 1000 of FIG. 10.

In an initial view 1110 of the segmentation zoom UI 1100, a user input is received indicative of a foreground object translation adjustment to the left. For example, the user input may correspond to selection of a left arrow of the translation adjustment UI element as described above. Based on the user input to the left translation arrow, the updated view 1120 of the segmentation zoom UI 1100 can display a composite image preview where the foreground object (e.g., person) is translated to the left relative to the background image data, which is left in an un-translated position. Translation adjustment can be performed live in the preview area of the segmentation zoom UI 1100, the same as or similar to the live (e.g., real-time) adjustment of the foreground and background segmentation zoom levels described above. In some examples, selection of a directional arrow of the translation adjustment UI element (e.g., left, right, up, down arrows) can correspond to a pre-determined translation amount. In some aspects, a directional arrow may be selected multiple times to increase the translation distance of the foreground object within the preview composite image. In another example, the length or distance of the translation in a particular direction can be based on a length of time that the corresponding directional translation arrow is selected for by the user.

Figure 12:
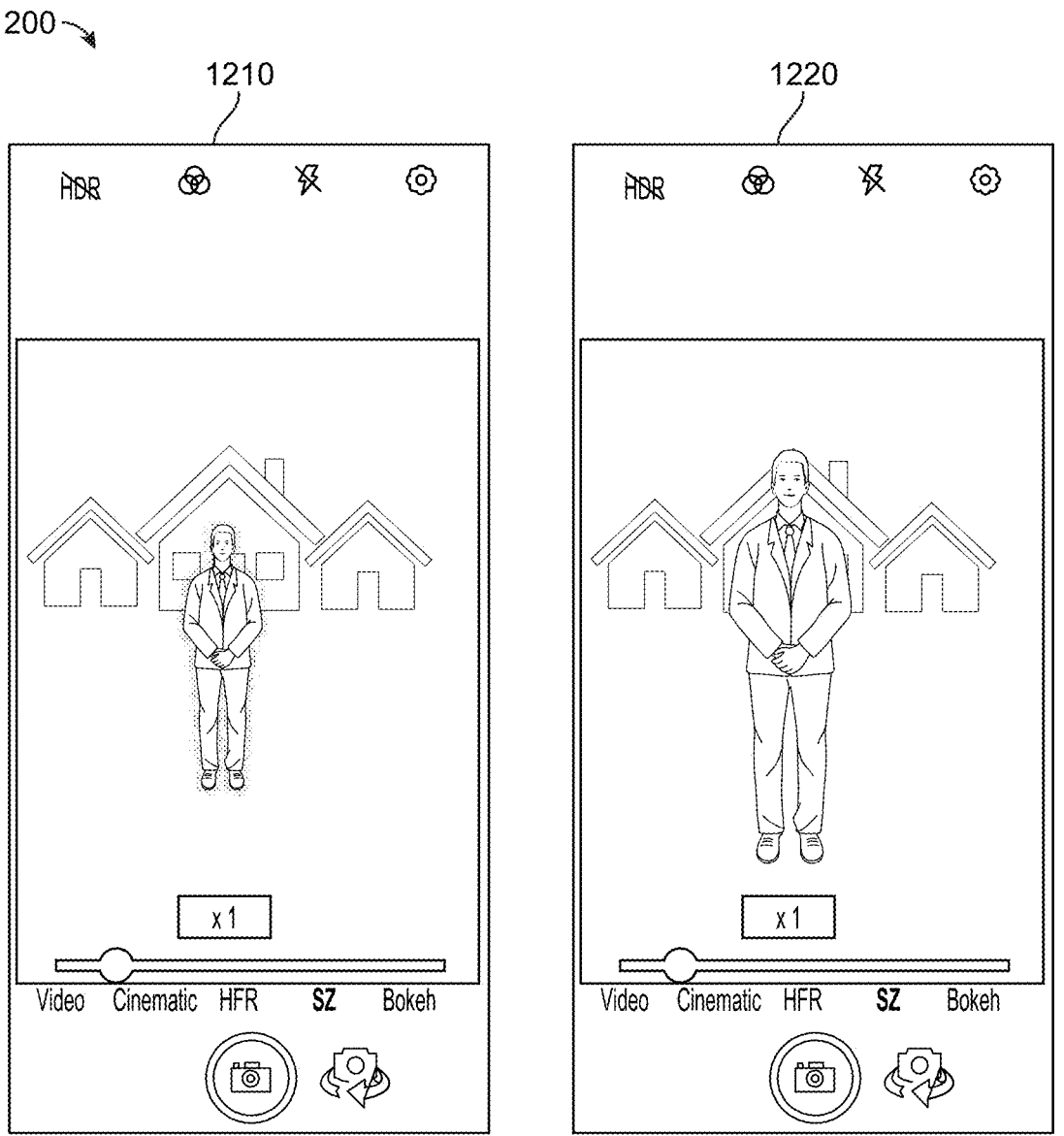
FIG. 12 illustrates an example of an image capture preview UI that can be used to compose and/or adjust a preview of a composite image based on one or more user input gestures corresponding to a foreground portion zoom level adjustment and/or a foreground portion location adjustment, compose and/or adjust a preview of a composite image, in accordance with some examples.

FIG. 12 illustrates an example of an image capture preview UI 1200 that can be used to compose and/or adjust a preview of a composite image based on one or more user input gestures corresponding to a foreground object zoom level adjustment and/or a foreground object location adjustment, compose and/or adjust a preview of a composite image, in accordance with some examples. The image capture preview UI 1200 can also be referred to as a segmentation zoom UI, and may be the same as or similar to one or more of the segmentation zoom UI 1000 of FIG. 10 and/or the segmentation zoom UI 1100 of FIG. 11.

In an initial view 1210 of the segmentation zoom UI 1200, a user input is received to select a foreground object of interest. For example, the user input can be a touch input selecting the person as the foreground object of interest. The initial view 1210 of the segmentation zoom UI 1200 can be updated to highlight the selected person in the foreground of the image preview, based on the user touch input selecting the person.

In some aspects, the user can adjust a composite image preview using one or more touch-based gestures. For instance, after selecting the person in the initial view 1210, the user may pinch out on the person to zoom in (e.g., increase the zoom level of the selected person relative to the background image data zoom level) and/or may pinch in on the person to zoom out (e.g., decrease the zoom level of the selected person relative to the background image data zoom level), etc. In another example, after selecting the person in the initial view 1210, the user may hold and slide the person to place them in a desired location in the composite image preview. For example, the updated composite image preview displayed in the updated view 1220 of segmentation zoom UI 1200 can correspond to a user input pinching out on the selected person from initial view 1210, where the zoom level of the selected person is increased based on the user input pinching out.

Figure 13:
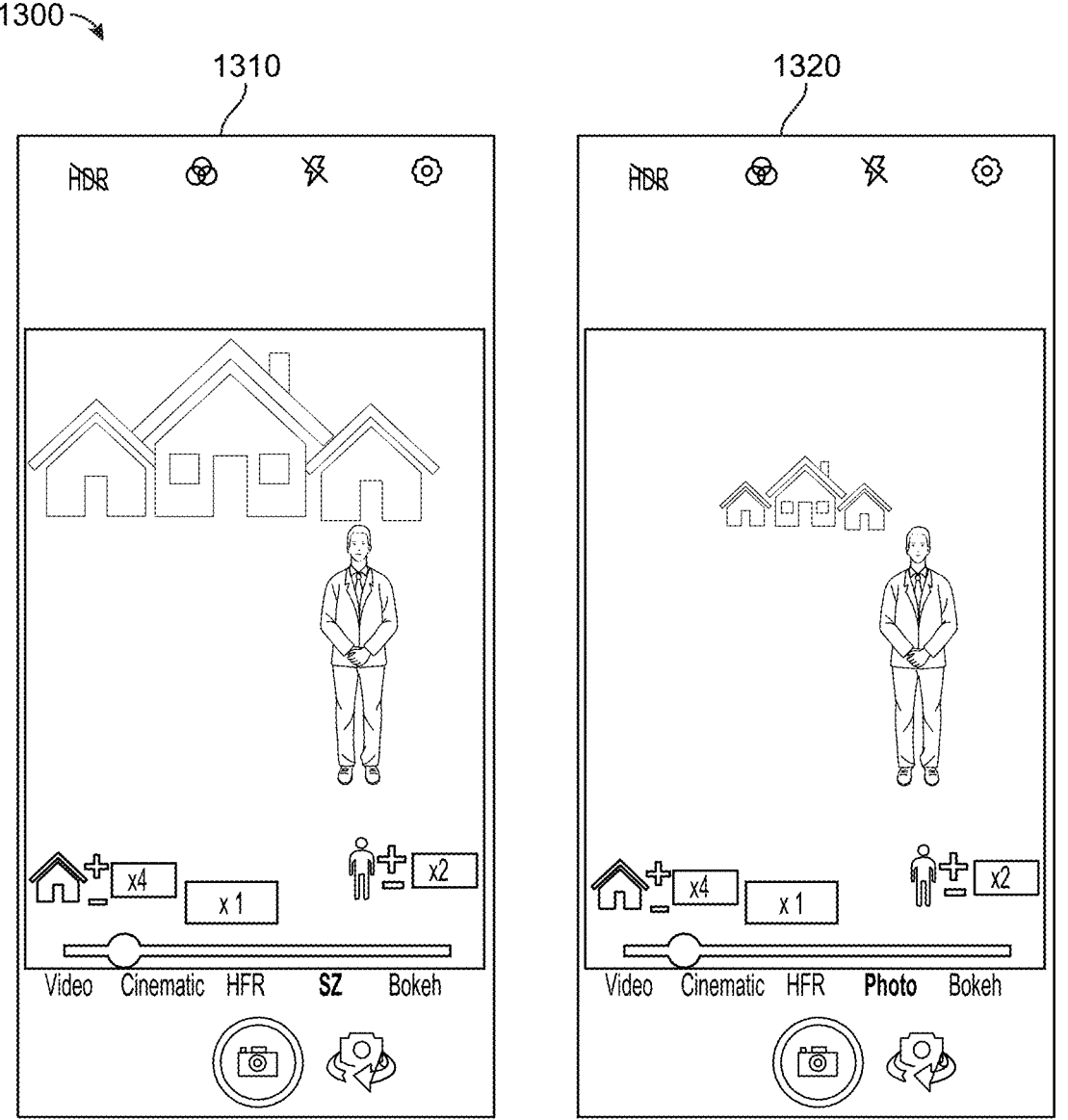
FIG. 13 illustrates an example of an image capture preview UI that can be used to compose and/or adjust a preview of a composite image based on adjusting a zoom level of background information obtained from a first image and/or adjusting a zoom level of foreground information obtained from a second image, in accordance with some examples.

FIG. 13 illustrates an example of an image capture preview UI 1300 that can be used to compose and/or adjust a preview of a composite image based on adjusting a zoom level of background information obtained from a first image and/or adjusting a zoom level of foreground information obtained from a second image, in accordance with some examples. The image capture preview UI 1300 can also be referred to as a segmentation zoom UI, and may be the same as or similar to one or more of the segmentation zoom UI 1000 of FIG. 10, the segmentation zoom UI 1100 of FIG. 11, and/or the segmentation zoom UI 1200 of FIG. 12.

In one illustrative example, the image capture preview UI 1300 can include a Main Zoom level adjustment (e.g., shown in initial view 1310 as set to a 1× main zoom level), a Person Zoom level adjustment (e.g., shown in initial view 1310 as set to a 2× zoom level), and a Background Zoom level adjustment (e.g., shown in initial view 1310 as set to a 4× zoom level).

The Main Zoom level adjustment and Person Zoom level adjustment of image capture preview UI 1300 can be the same as or similar to the corresponding zoom level adjustments described above with respect to FIGS. 3-12. In one illustrative example, the Background Zoom level adjustment can be used to generate a composite image preview based on additionally segmenting and adjusting the zoom level of a background object, such as a house. For instance, the zoom level of a selected background object (e.g., house) can be adjusted separately from the zoom level of a selected foreground object (e.g., person), and vice versa. The zoom level of the selected background object (e.g., house) can also be adjusted separately from the zoom level of the main image frame (e.g., the image data other than the person or the house). The zoom level of the selected foreground object (e.g., person) can also be adjusted separately from the zoom level of the main image frame (e.g., the image data other than the person or the house).

In the initial view 1310, the background object (e.g., house) is segmented and combined into the 1× main image frame preview at a 4× zoom level, and the foreground object (e.g., person) is segmented and combined into the 1× main image frame preview at a 2× zoom level.

In the updated view 1320, the background object (e.g., house) is shown at a 1× zoom level that is the same as the 1× zoom level of the main image frame preview. In some examples, based on the background object zoom level and the main image frame zoom level being the same, segmentation of the background object is not performed. For instance, the preview image displayed in the updated view 1320 can be generated based on segmenting a 2× telephoto view of the foreground person and combining the 2× segmented person with a 1× image that includes the main scene view and the background house object.

In some examples, one or more of the segmentation zoom adjustments described herein can be performed after image capture. For instance, when a command to capture an image is received (e.g., user selection of a camera or shutter button in the segmentation zoom UI), image data can be captured using multiple different cameras and/or focal lengths associated with the computing device. In some examples, image data can be captured using each camera of a plurality of cameras included in the computing device, where each camera of the plurality of cameras has a different focal length.

The composite image generated and stored in response to receiving the command to capture an image can be a composite image that is adjusted during image preview (e.g., prior to image capture, as described previously above with respect to FIGS. 3-13). Based on storing the image data of all available cameras and focal lengths obtained at the same time as the initial composite image, the systems and techniques can be used to generate an updated composite image at a later time (e.g., after image capture). For instance, the additional image data from different focal lengths can be stored as part of the metadata of the initial composite image capture. In some aspects, the user can later adjust the zoom level of the foreground and/or background, and/or can adjust the translation of a foreground and/or background object, at some time after the initial capture of the image data.

Figure 14:
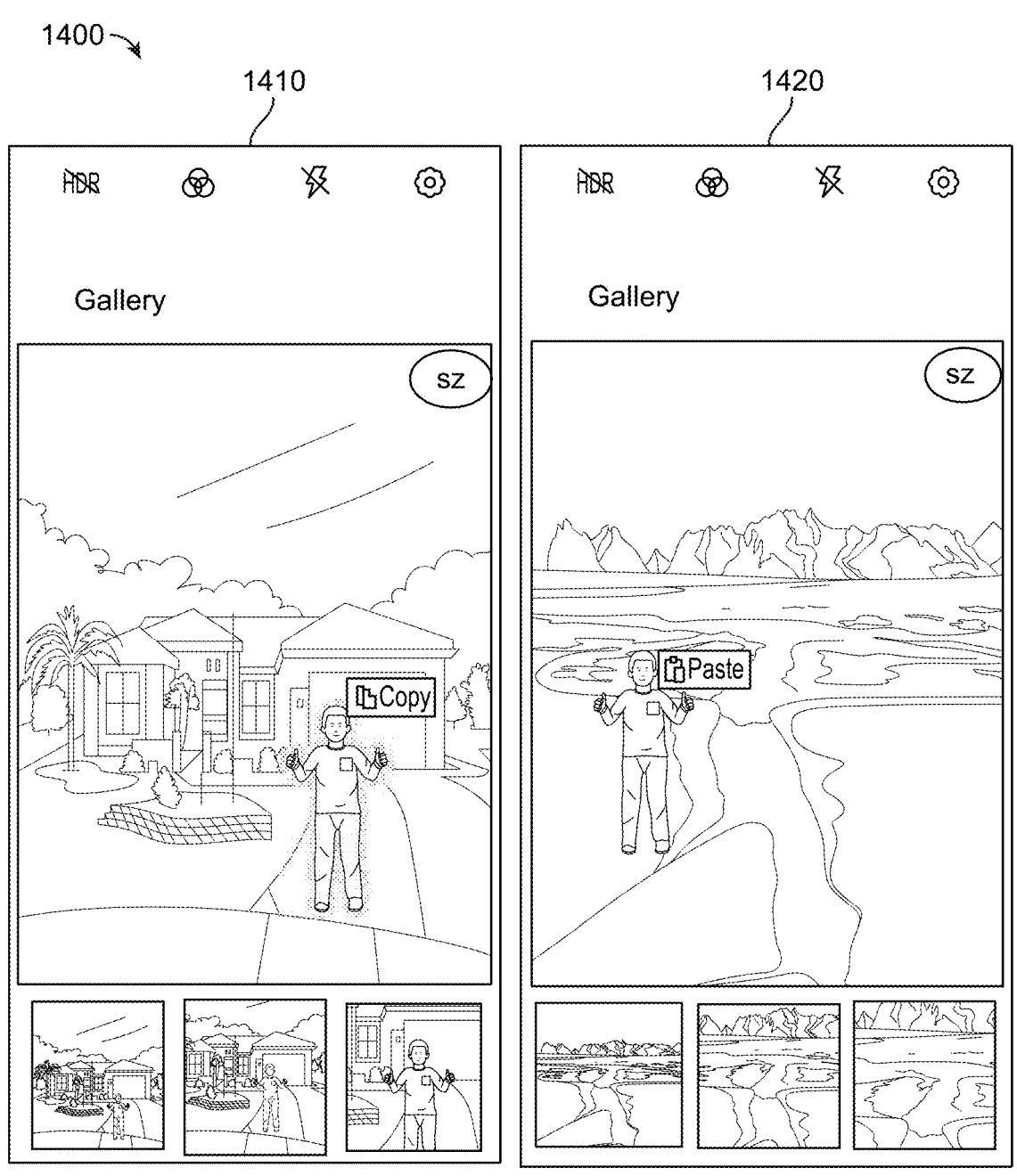
FIG. 14 illustrates an example of an image adjustment UI that can be used to segment a foreground portion from a first image and composite the segmented foreground portion with background information obtained from a second image, in accordance with some examples.

FIG. 14 illustrates an example of an image adjustment UI 1400 that can be used to segment a foreground object from a first image and composite the segmented foreground object with background information obtained from a second image, in accordance with some examples. For instance, in a gallery view of an image that was previously captured, the user can long press on the person from a photo and select an option to copy the person (or other selected foreground object) to a different photo. After selecting the 'Copy' option for the selected person or foreground object, the user can go to a different, desired photo and long press on a location where the user wishes to paste the copied person or foreground object. Selection of a 'Paste' option results in the segmented person from the initial frame 1410 being overlaid onto or otherwise combined with the composite frame 1420. The selection of a person or other foreground object using the 'Copy' option in initial frame 1410 can be based on segmentation information that was previously generated, in examples where the initial frame 1410 is itself a composite frame generated according to the systems and techniques described herein. In other examples, where the initial frame 1410 is not a composite frame generated using a segmented person shot at a different focal length than the background, selection of the 'Copy' option in initial frame 1410 can trigger segmentation of the selected person from the initial frame 1410 using one or more segmentation machine learning networks, as described previously above.

FIGS. 15A-D illustrate example images 1500 corresponding to shadow matting and/or shadow compositing, in accordance with some examples. Shadow matting can be performed using the shadowing matting engine 520 of FIG. 5. Shadow compositing can be performed using the shadow compositing engine 550 of FIG. 5.

In some aspects, shadow compositing and/or shadow matting can be similar to image compositing and/or image matting. In some cases, shadow compositing and/or shadow matting can be included in or a subset of image compositing and/or image matting, respectively.

Image matting is the process of accurately cutting out the foreground from an image. For instance, image matting can be used to generate the segmented person result 503 of FIG. 5 by cutting out the foreground (e.g., person) from the image 502 of FIG. 5. Image compositing is the process of pasting the cut-out foreground in another image. For instance, image compositing can be performed using the image compositing engine 540 of FIG. 5 to combine the segmented person result 503 of FIG. 5 with the background only image 505 of FIG. 5.

In image segmentation, each pixel can be analyzed to determine whether the pixel belongs to the foreground classification or background classification of the image. However, this binary approach to segmentation (e.g., either foreground pixel or background pixel) may be unable to deal with natural scenes that contain fine details (e.g., hair, fur, etc.). In some cases, scenes with fine details such as a hair and fur can be segmented based on estimating a transparency value for each pixel of a foreground object. For instance, without estimating a transparency value for each pixel of a segmented foreground object, portions of the background image become trapped between the fine details of the foreground object during foreground segmentation, and can result in a composite image that is unrealistic. For example, background pixels corresponding to blue sky, etc., can become trapped between the fine details of the hair on the head of a segmented foreground person, and can result in an unrealistic composite image when the segmented person is overlaid onto another image.

In one illustrative example, the image segmentation engine 510 of FIG. 5 can further include or otherwise implement an image matting engine (e.g., a sub-engine or sub-system of engine 510). Image matting can be performed to estimate a foreground opacity of some (or all) of the pixels included in the foreground segmentation estimated by the image segmentation engine 510. Image matting can be used to implement a more accurate segmentation of the foreground and background of an image.

In some aspects, the image segmentation engine 510 of FIG. 5 can generate a segmentation map of the person, based on classifying each pixel as corresponding to the person or not corresponding to the person (e.g., background pixel). The segmentation map of the person can be the same as or similar to the person segmentation map 620 of FIG. 6.

The image segmentation engine 510 of FIG. 5 can further generate a matting map of the person. In both the segmentation map of the person and the matting map of the person, pixels with a first value (e.g., equal to '1') belong to the foreground object (e.g., person) and pixels with a second value (e.g., equal to '0') belong to the background.

The matting map can be generated to include one or more pixels that have a value between 0 and 1, indicative of an estimated transparency value for the pixel. The pixels of the matting map can each correspond to a respective pixel in the segmentation map of the person. For instance, the matting map can estimate a transparency value for pixels that are along a border between the foreground and background classifications in the person segmentation map. Pixels in the matting map with a value between 0 (e.g., background pixel) and 1 (e.g., foreground pixel) can be treated as belonging to both the foreground and background portions of the segmentation, with a transparency based on the corresponding value in the matting map. For instance, a matting map pixel with a value of 0.8 can be represented at 80% opacity in the segmented foreground (e.g., and would also be represented at 20% opacity in the background class). In some aspects, the use of a matting map for the segmented person result 503 of FIG. 5 can be used to generate a more realistic composite image (e.g., such as the composite image 507, 509, etc. of FIG. 5, and/or various other composite images described herein), based on a more gradual transition from foreground to background in the resulting composite image.

In some aspects, the image compositing performed using image compositing engine 540 of FIG. 5 may vary in complexity based at least in part on the accuracy of an image matting map generated or otherwise used by the image segmentation and image matting engine 510 of FIG. 5. For instance, if the image matting map is more accurate, the image compositing step performed using image compositing engine 540 can be reduced in complexity (e.g., multiplication of the image matting map with the foreground frame 502, and addition of the result to the background frame 504 or 505). In some aspects, if the image matting map is inaccurate and/or if an image matting map is not used by the image segmentation engine 510, one or more post-processing steps may be applied to improve the realism of the border regions around the segmented person result 503 in the composited image. For instance, blending may be used to smooth the transition around the borders of the segmented person result 503 when composited onto the background only frame 505 of FIG. 5.

Shadow matting and shadow compositing can, in some aspects, be performed to generate a composite image. For instance, shadow matting engine 520 of FIG. 5 can be used in combination with the image segmentation and/or image matting engine 510 of FIG. 5 to generate a segmented person result 503 that further includes shadow matting information.

FIGS. 15A-D depicts four example image frames associated with an example of shadow matting and shadow composition. The image frame of FIG. 15A is a background image frame, and may be the same as or similar to the background image data 504 of FIG. 5. The image frame of FIG. 15B is a foreground image frame, and may be the same as or similar to the foreground image data 502 of FIG. 5. The image frame of FIG. 15C is an example of a merged or composite result without shadow, based on segmenting only the person and not the person's shadow from the foreground image frame of FIG. 15B. The image frame of FIG. 15D is an example of a merged or composite result with shadow, based on segmenting the person and the person's shadow from the foreground image frame of FIG. 15B

Images often include one or more shadows or reflections. If segmentation is performed just for the foreground person (e.g., if segmentation engine 510 does not segment the shadow of the foreground person), the resulting composite image generated based on the segmentation may be unrealistic. For instance, the image frame of FIG. 15C depicts an example of a merged or composite image result where the person is segmented from the foreground image frame of FIG. 15B but the person's shadow is not included in the segmentation. In this example, the resulting composite image frame of FIG. 15C can appear unrealistic based on the 3× segmented person lacking a shadow that is the proper size and in the proper position. The image frame of FIG. 15D depicts an example of a merged or composite image result where both the person and the person's shadow are segmented from the foreground image frame of FIG. 15B. Based on including the shadow in the segmented person result used to generate the composite image frame of FIG. 15D, the composited result can appear more natural and realistic. Additionally, including the shadow in the segmented person result can contribute to the impression that the segmented person is standing on the surface beneath their feet in the composited image frame result of FIG. 15D.

The example composite image frame of FIG. 15D includes two shadows, a first shadow corresponding to the person's position and relative size in the background image of FIG. 15A and a second shadow from the segmented person result (e.g., a second shadow corresponding to the person's position and relative size in the foreground image of FIG. 15B).

Shadow matting can be used to remove the shadow of a foreground object that is removed from an image. For instance, the 1× person removed result 710 of FIG. 7 is generated by removing the person from the foreground of the 1× background image frame and by additionally removing the person's shadow from the foreground of the 1× background frame. In one illustrative example, the person's shadow can be removed from the foreground of the 1× background image using the shadow matting engine 520 of FIG. 5.

In some aspects, shadow matting can be performed to remove or cut out the shadow of the foreground from an image and shadow compositing can be performed to paste the removed shadow at the right place in a composite image such that the pasted shadow adapts to the texture and/or shape of the surface it is placed on within the composite image. In some examples, shadow matting and shadow compositing can improve the realism of a composite image, such as in examples where the shadow matt is overlaid onto a background object in the composite image having a different shape or orientation than the shadow in the foreground source image.

FIGS. 16A-C illustrate example images 1600 corresponding to image completion and/or image inpainting, in accordance with some examples. In some aspects, the image completion and inpainting of FIG. 16 can be the same as or similar to image completion and/or inpainting performed using the image completion and inpainting engine 530 of FIG. 5. For instance, image completion and inpainting can be performed when the foreground (e.g., person) zoom level is increased in the composite image preview. When the foreground (e.g., person) zoom level is increased, the foreground segmentation from the higher zoom level image data will be placed on top of the smaller foreground in the current frame (e.g., main or background frame) to generate the composite image preview.

In some cases, the larger (e.g., increased zoom level) segmented foreground person will not be able to completely cover or hide the smaller foreground that is being replaced in the current frame. For instance, the segmented 3× person in image frame of FIG. 15D does not completely cover the smaller foreground person from the 1× background frame, and also does not completely cover the smaller foreground person's shadow from the 1× background frame.

In one illustrative example, the image completion and inpainting engine 530 of FIG. 5 can be used to remove the pixels corresponding to the smaller person or other foreground object from the 1× background frame, prior to pasting the segmented 3× person on top to generate the composite image. In some aspects, when the foreground object (e.g., person) zoom level is to be decreased, it may be necessary to erase the foreground object (e.g., person) in the current frame before compositing the smaller segmented person in the frame. In some examples, the missing gap where the foreground object and shadow are removed from the current or background frame can be filled in with interpolated pixel data or other pixel data generated based on neighboring regions and/or other frames which have the missing information. For instance, image inpainting and/or image completion can be implemented as the process of filling in missing pixel locations based on the known neighboring regions or patterns of the image.

The image frame of FIG. 16A is a background frame of image data, and may be the same as or similar to the background image data 504 of FIG. 5. The image frame of FIG. 16B depicts the background frame of image data with the foreground object (e.g., person and shadow) erased. For instance, the foreground object (person and shadow) can be removed using a foreground matting map and a shadow matting map, as described previously above. The image frame of FIG. 16C depicts the image frame of FIG. 16B with inpainting applied. In some aspects, the process of inpainting can also be referred to as "image completion," and the image frame of FIG. 16C can also be referred to as a "completed background only image." The image frame of FIG. 16C can be the same as or similar to the completed background only image 505 of FIG. 5

Returning to the discussion of FIG. 5, in some aspects, the image harmonization engine 560 can be used to perform image harmonization to improve the visual consistency of a composite image and/or composite image preview generated using the system 500 of FIG. 5. For instance, image harmonization can improve the visual consistency of a composite image (e.g., such as the harmonized composite image 509 of FIG. 5) based on adjusting the appearances of the foreground image segmentation and the completed background image frame to make them compatible or otherwise consistent with one another. For instance, image data obtained using different cameras can have different image capture properties and/or settings, such as color temperature values, Auto White Balance (AWB) settings, etc. In some aspects, the systems and techniques can use the image harmonization engine 560 to perform image harmonization to match color temperature and/or white balance settings across the various portions of image data that are combined into a composite image (e.g., such as the non-harmonized composite image 507 of FIG. 5, the harmonized composite image 509 of FIG. 5, etc.)

FIG. 17 is a flowchart illustrating an example of a process 1700 for processing image and/or video data. At block 1702, the process 1700 includes obtaining first image data of a scene, the first image data associated with a first zoom level and including at least a foreground portion and a background portion. For example, the first image data can the same as or similar to a respective one of the image data 310, 320 of FIG. 3A; a respective one of the image data 360, 370 of FIG. 3B; the 1.5× image data 410 of FIG. 4; a respective one of the 3× image data 502 or the 1× image data 504 of FIG. 5; a respective one of the 1× image data 602 or the 3× image data 610 of FIG. 6; the 1× image data 504 of FIG. 7; the 1× image data of 910 of FIG. 9; etc.

In some cases, the first image data can be a first frame obtained prior to receiving an input to capture a frame. For instance, the first image data can be obtained prior to receiving an input to capture a frame. The first image data can additionally be obtained prior to capturing the frame based on the input to capture a frame. For instance, the first image data can be a preview frame obtained prior to receiving an input to obtain a captured frame. In some examples, the first image data can be associated with a composite image preview frame and the captured frame can be a composite image captured frame.

In some cases, the first image data comprises first image data (e.g., image frames outputted prior to receiving an input to capture an image) obtained using a first camera having a first focal length. For instance, the first image data can be first image preview data (e.g., first image preview frames) obtained using a first camera having a first focal length. In some cases, the first image data is associated with a first camera having a first focal length corresponding to the first zoom level. In some examples, the first image data can be a relatively wide-angle image data associated with a relatively wide-angle zoom level.

At block 1704, the process 1700 includes receiving a user input indicative of an adjustment to increase or decrease a zoom level of the foreground portion relative to the background portion included in the first image data, wherein the adjustment corresponds to a second zoom level greater than the first zoom level or a second zoom level less than the first zoom level. For example, the user input can be received using a user interface (UI) or graphical user interface (GUI) that is the same as or similar to one or more of the UIs and/or GUIs of FIGS. 3-16. In some examples, the adjustment to increase or decrease the zoom level of the foreground portion is an adjustment to increase the zoom level of the foreground portion relative to the background portion included in the first image data, wherein the adjustment corresponds to a second zoom level that is greater than the first zoom level. For instance, the adjustment to the zoom level can increase the zoom level of the foreground portion as described with respect to the composite image 330 of FIG. 3A. For example, the foreground portion and the background portion are both associated with a first zoom level of 1× in the first image data 310 of FIG. 3A. In the composite image 330 of FIG. 3A, the zoom level of the foreground portion is increased to a 3× second zoom level, relative to the 1× first zoom level of the background portion.

In another example, the adjustment to increase or decrease the zoom level of the foreground portion is an adjustment to decrease the zoom level of the foreground portion relative to the background portion in the first image data, wherein the adjustment corresponds to a second zoom level that is less than the first zoom level. For instance, the adjustment to the zoom level can decrease the zoom level of the foreground portion as described with respect to the composite image 380 of FIG. 3B.

In some cases, receiving the user input indicative of the adjustment to increase or decrease the zoom level of the foreground portion relative to the background portion in the first image data comprises receiving a first user input indicative of a selected foreground portion from one or more foreground portions included in the first image data of the scene, and receiving a second user input indicative of the adjustment to increase or decrease the zoom level of the selected foreground portion relative to the background portion (e.g., non-selected portion of the first image data). For instance, the first user input indicative of the selected foreground portion can be the same as or similar to the touch or long-press input depicted in example zoom UI 1210 of FIG. 12 and the second user input indicative of the adjustment to increase or decrease the zoom level of the selected foreground portion can be the same as or similar to the increase in zoom level depicted in the example zoom UI 1220 of FIG. 12.

In some examples, the user input indicative of the adjustment to increase or decrease the zoom level of the foreground portion relative to the background portion in the first image data is received in a graphical user interface (GUI). For instance, the GUI can comprise a slider, wherein moving the slider in a first direction is indicative of an increase to the zoom level and moving the slider in a second direction is indicative of a decrease to the zoom level. In some cases, the GUI includes a plurality of discrete step adjustments, each discrete step adjustments corresponding to a pre-determined increase or decrease to the zoom level.

In some examples, the process 1700 includes receiving a user input indicative of an adjustment to increase or decrease a zoom level of the background portion relative to the foreground portion in the first image data and automatically determining a corresponding adjustment to increase or decrease the zoom level of the foreground portion. The corresponding adjustment to increase or decrease the zoom level of the foreground portion can be automatically determined relative to the user input indicative of the adjustment to increase or decrease the zoom level of the background portion. A composite image can be generated based on the adjustment to increase or decrease the zoom level of the background portion and the automatically determined corresponding adjustment to increase or decrease the zoom level of the foreground portion.

In some examples, the process 1700 includes automatically determining a corresponding adjustment to increase or decrease a zoom level of the background portion, based on receiving the user input indicative of the adjustment to increase or decrease the zoom level of the foreground portion. A composite image can be generated based on the adjustment to increase or decrease the zoom level of the foreground portion and the automatically determined corresponding adjustment to increase or decrease the zoom level of the background portion.

At block 1706, the process 1700 includes obtaining a second image data of the scene based on the adjustment and using the second zoom level, the second image data including an adjusted foreground portion associated with the second zoom level. In some cases, the second image data can be a second fame obtained prior to receiving an input to capture a frame. For example, the first image data and the second image can be respective first and second frames that are obtained prior to receiving an input to capture a frame. The first and second frames can additionally be obtained prior to capturing the frame based on receiving the input to capture a frame. For instance, the second image data can be a preview frame obtained prior to receiving an input to obtain a captured frame. In some examples, the first image data and the second image data can be associated with a composite image preview frame and the captured frame can be a composite image captured frame For example, the second image data can the same as or similar to a respective one of the image data 310, 320 of FIG. 3A; a respective one of the image data 360, 370 of FIG. 3B; the 1.5× image data 410 of FIG. 4; a respective one of the 3× image data 502 or the 1× image data 504 of FIG. 5; a respective one of the 1× image data 602 or the 3× image data 610 of FIG. 6; the 1× image data 504 of FIG. 7; the 1× image data of 910 of FIG. 9; etc.

In some examples, the first image data can be the image data 310 of FIG. 3A and the second image data can be the image data 320 of FIG. 3A. In some examples, the first image data can be the image data 360 of FIG. 3B and the second image data can be the image data 370 of FIG. 3B.

In some examples, the first image data can be the image data 410 of FIG. 4. In some examples, the first image data can be the image data 504 of FIG. 5 and the second image data can be the image data 502 of FIG. 5. In some examples, the first image data can be the image data 602 of FIG. 6 and the second image data can be the image data 610 of FIG. 6. In some examples, the first image data can be the image data 504 of FIG. 7. In some examples, the first image data can be the image data 910 of FIG. 9.

In some aspects, the second image data comprises second image data (e.g., image frames outputted prior to receiving an input to capture an image) obtained using a second camera having a second focal length. For instance, the second image data can be second image preview data (e.g., second image preview frames) obtained using a second camera having a second focal length. In some cases, the second image data is associated with a second camera having a second focal length corresponding to the second zoom level. In some examples, the first camera is different from the second camera, and the first camera and the second camera are included in an imaging system of a computing device. For instance, the first and second cameras can be different cameras included in the same computing device, smartphone, mobile computing device, user computing device, etc. In some cases, the first and second cameras are different cameras included in or otherwise associated with the example computing device 100 of FIG. 1 and/or the example computing system 1800 of FIG. 18.

In some examples, the second image data is obtained based on the adjustment to the zoom level of the foreground portion. For instance, the second image data can be obtained using a zoom level (and camera having a corresponding focal length) that is greater than the first zoom level, based on the adjustment to the zoom level of the foreground portion being an increase in zoom level. In another example, the second image data can be obtained using a zoom level (and camera having a corresponding focal length) that is less than the first zoom level, based on the adjustment to the zoom level of the foreground portion being a decrease in zoom level.

In some cases, obtaining the second image data of the scene comprises scaling the first image data to obtain a scaled first image data, wherein the scaled first image data is associated with the second zoom level. For instance, the scaled first image data can include a scaled foreground portion corresponding to the foreground portion.

At block 1708, the process 1700 includes generating a segmented foreground portion based on segmenting the adjusted foreground portion from the second image data of the scene. For instance, the segmented foreground portion can be generated using a segmentation machine learning network. In some cases, the segmented foreground portion can be generated using the image segmentation and image matting engine 510 of FIG. 5. For instance, the segmented foreground portion can be the same as or similar to the segmented foreground portion 503 of FIG. 5, the segmented foreground portion 650 of FIG. 6, the segmented foreground portion 650 of FIG. 8, etc.

In some cases, generating the segmented foreground portion comprises determining, based on the second image data, a segmentation map classifying each pixel of a plurality of pixels of the second image data into a foreground class or a non-foreground class. For instance, the segmentation map can be the same as or similar to the segmentation map 620 of FIG. 6, the segmentation map 710 of FIG. 7, the segmentation map 12020 or 1030 of FIG. 10, etc.

In some cases, the segmented foreground portion can be generated based on multiplying the segmentation map with the second image data.

In some examples, a matting map can be generated corresponding to the segmentation map, wherein the matting map includes a transparency value for at least a portion of the pixels of the segmentation map classified as the foreground class. In some cases, the segmented foreground portion can be generated based on combining the segmentation map and the matting map.

In some cases, shadow matting information corresponding to a shadow of the foreground portion can be determined based on the second image data of the scene. For instance, shadow matting information corresponding to a shadow of the foreground portion of foreground source image (e.g., second image) 502 of FIG. 5 can be determined using the shadow matting engine 520 of FIG. 5, based on the second image data of the scene (e.g., foreground source image 502). In some examples, the shadow matting information can be used to update the segmented foreground portion to further include pixels of the second image data corresponding to the shadow of the foreground portion. For instance, the segmented foreground portion 503 can be updated by the shadow matting engine 520 to include pixels of the second image data 502 corresponding to the shadow of the foreground portion.

At block 1710, the process 1700 includes generating a composite image based on combining the segmented foreground portion from the second image data of the scene with at least a portion of the first image data of the scene. In some cases, the composite image can be generated using the image compositing engine 540 of FIG. 5. In some cases, the composite image can be generated additionally using one or more (or all) of the image completion and inpainting engine 530 of FIG. 5, the shadow compositing engine 550 of FIG. 5, and/or the image harmonization engine 560 of FIG. 5.

In some examples, the composite image can be the same as or similar to one or more of the composite image 330 of FIG. 3A, the composite image 380 of FIG. 3B, the composite image 420 of FIG. 4, the composite image 507 or 509 of FIG. 5, the composite image 850 of FIG. 8, the composite image 950 of FIG. 9, the composite image 1010 or 1050 of FIG. 10, the composite image 1110 or 1120 of FIG. 11, the composite image 1220 of FIG. 12, the composite image 1310 or 1320 of FIG. 13, the composite image 1410 or 1420 of FIG. 14, the composite image (c) or (d) of FIG. 15, etc.

In some examples, generating the composite image includes generating a preview of the composite image. In some examples, generating the composite image includes outputting a first frame corresponding to the composite image prior to receiving an input to capture a frame of the composite image. For instance, generating the preview of the composite image can include displaying, using an image capture user interface (UI), a portion of the first image data composited with a portion of the second image data. For example, a segmented adjusted foreground portion with the second zoom level (obtained from the second image data or second preview frame) can be composited with a background portion with the first zoom level (obtained from the first image data or first preview frame).

In some cases, a command to capture an image frame (e.g., an input to capture a frame) can be received for capturing the composite image, wherein receiving the command to capture the image comprises receiving a user input to the image capture UI. In some examples, the input to capture a frame is a command to capture the composite image and comprises a user input to the image capture UI. In some examples, the user input corresponds to a shutter button of the image capture UI. For instance, the command to capture an image can be a user input corresponding to a shutter button of the image capture UI, such as the shutter button shown at the bottom center of each example UI 310, 320, 330, 360, 370, 380 of FIGS. 3A and 3B; the shutter button shown at the bottom center of each example UI 410 and 420 of FIG. 4; the shutter button shown at the bottom center of the example UI 602 of FIG. 6; the shutter button shown at the bottom center of each example UI 910 and 950 of FIG. 9; the shutter button shown at the bottom center of each example UI 1010 and 1050 of FIG. 10; the shutter button shown at the bottom center of each example UI 1110 and 1120 of FIG. 11; the shutter button shown at the bottom center of each example UI 1210 and 1220 of FIG. 12; the shutter button shown at the bottom center of each example UI 1310 and 1320 of FIG. 13; etc.

In some examples, generating the composite image includes outputting a first frame corresponding to the composite image and receiving an input to capture a frame, wherein the input is received subsequent to outputting the first frame. In some cases, the first frame can be a preview frame corresponding to the composite image. For instance, the first frame can be a preview frame generating using the architecture 500 of FIG. 5. Generating the composite image can additionally include outputting a captured frame corresponding to the composite image, based on receiving the input to a capture a frame (e.g., a command to capture an image, etc.). The captured frame can be a composite image captured frame generated using the architecture 500 of FIG. 5. In some examples, the first frame is a preview frame corresponding to the composite image and the captured frame is the composite image. The captured frame can be different from the first frame.

In some cases, the composite image is outputted prior to receiving a command to capture an image. In some cases, a preview of the composite image is outputted and a command to capture a composite image frame corresponding to the preview of the composite image is received. In some cases, a preview of the composite image is outputted and the user input indicative of the adjustment to the zoom level of the foreground portion is received based on the preview of the composite image. In some cases, a user input indicative of an adjustment to one or more of the first zoom level or the second zoom level is received based on the preview of the composite image. In some cases, the composite image is displayed in a preview, wherein the preview includes the composite image and at least a first graphical user interface (GUI) associated with receiving the user input indicative of the adjustment to increase or decrease the zoom level of the foreground portion.

In some cases, the preview comprises the first GUI overlaid on the composite image. In some examples, the first GUI is collapsible within the preview. In some examples, the process 1700 further includes receiving a user input to one or more of the preview or the first GUI and collapsing the first GUI based on the user input, wherein collapsing the first GUI comprises removing from the preview an overlay of the first GUI.

In some examples, block 1710 further includes removing, from the first image data and based on segmentation information of the foreground portion in the first image data, pixels corresponding to the foreground portion. For instance, the foreground portion can be removed from the first image data 504 of FIG. 5 and FIG. 7, based on the segmentation information of the foreground portion in the first image data that is the same as or similar to the 1× subject segmentation map 710 of FIG. 7. Removing the foreground portion from the first image data can include generating, using an image completion engine (e.g., image completion and inpainting engine 530 of FIG. 5), a subject removed in background result that is the same as or similar to the subject removed in background result 720 of FIG. 7. In some cases, removing the foreground portion from the first image data can include generating, using an image completion engine (e.g., image completion and inpainting engine 530 of FIG. 5), an inpainted first image data, wherein each removed pixel of the pixels corresponding to the foreground portion in the first image data is replaced with a corresponding inpainted pixel.

In some examples, an image completion engine can be used to generate an inpainted first image data, wherein each removed pixel of the pixels corresponding to the foreground portion in the first image data is replaced with a corresponding inpainted pixel. For instance, the image completion engine can be the same as or similar to the image completion and inpainting engine 530 of FIG. 5. In some cases, the inpainted first image data can be the same as or similar to the 1× background only result 505 of FIG. 5 and FIG. 7. In some cases, generating the composite image includes generating an inverted segmentation map based on inverting a segmentation map corresponding to the segmented foreground portion from the second image data, and adding the segmented foreground portion to a product of the inverted segmentation map with the inpainted first image data.

In some cases, the composite image includes background image data of the scene associated with the first zoom level and an adjusted foreground portion image data corresponding to the second zoom level and the user input indicative of the adjustment to increase or decrease the zoom level of the foreground portion relative to the background portion in the first image data.

In some cases, a user input can be received indicative of an additional adjustment to increase or decrease a zoom level of the background portion relative to the foreground portion in the first image data. A third image data of the scene can be obtained based on the additional adjustment and using a third zoom level corresponding to the additional adjustment, the third image data including at least an adjusted background portion associated with the third zoom level. The third zoom level can be different from at least one (or both) of the first zoom level and the second zoom level. A segmented background portion can be generated based on segmenting the background portion from the third image data of the scene. The composite image can be generated based on combining the segmented foreground portion from the second image data of the scene, the segmented background portion from the third image data of the scene, and a portion of the first image data of the scene. For instance, the first zoom level can correspond to the ×1 main zoom level of FIG. 13, the second zoom level can correspond to the ×2 person zoom level of FIG. 13, and the third zoom level can correspond to the ×4 background zoom level of FIG. 13.

In some examples, an additional user input indicative of an adjustment to a position of the foreground portion can be received. For instance, the additional user input can be a translation input indicative of a translation adjustment that is the same as or similar to the left translation adjustment of FIG. 11. In some cases, the composite image can be generated further based on translating the segmented foreground portion based on the additional user input, wherein the segmented foreground portion is translated relative to the portion of the first image data of the scene. For instance, the composite image can be the same as or similar to the translated composite image 1120 of FIG. 11, and may correspond to the non-translated composite image 1110 of FIG. 11. In some cases, translating the segmented foreground portion is based on generating a translated segmentation map corresponding to the segmented foreground portion and the additional user input indicative of the adjustment to the position of the foreground portion. For instance, the segmented foreground portion can be the same as or similar to the ×3 initial subject segmentation map 1020 of FIG. 10 and the translated segmentation map can be the same as or similar to the ×3 translated subject segmentation map 1030 of FIG. 10. In some cases, the translated composite image can be the same as or similar to the translated composite image 1050, and may correspond to the non-translated composite image 1010 of FIG. 10.

In some cases, a first GUI can be used to receive the user input indicative of the adjustment to increase or decrease the zoom level of the foreground portion relative to the background portion in the first image data. A second GJUI can be used to receive a user input indicative of an adjustment to increase or decrease a zoom level of the background portion relative to the foreground portion in the first image data. In some cases, the composite image further includes the first GUI and the second GUI. For instance, the composite image can be displayed in a preview (e.g., the composite image can be a preview frame and/or a first frame outputted prior to receiving an input to capture an image), where the preview includes the composite image, the first GUI, and the second GUI. In some cases, displaying the composite image in the preview comprises outputting a preview image data corresponding to the composite image, overlaying the first GUI on top of the preview image data, and overlaying the second GUI on top of the preview image data. In some examples, one or more of the first GUI or the second GUI is collapsible within the preview. In some cases, the composite image further includes a third GUI element. The third GUI element can comprise a capture icon associated with capturing the composite image (e.g., associated with receiving the input to capture an image).

In some examples, the processes described herein (e.g., process 1700 and/or any other process described herein) may be performed by a computing device, apparatus, or system. In one example, the process 1700 can be performed by a computing device or system having the computing device architecture 1800 of FIG. 18. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 1700 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1700 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 18:
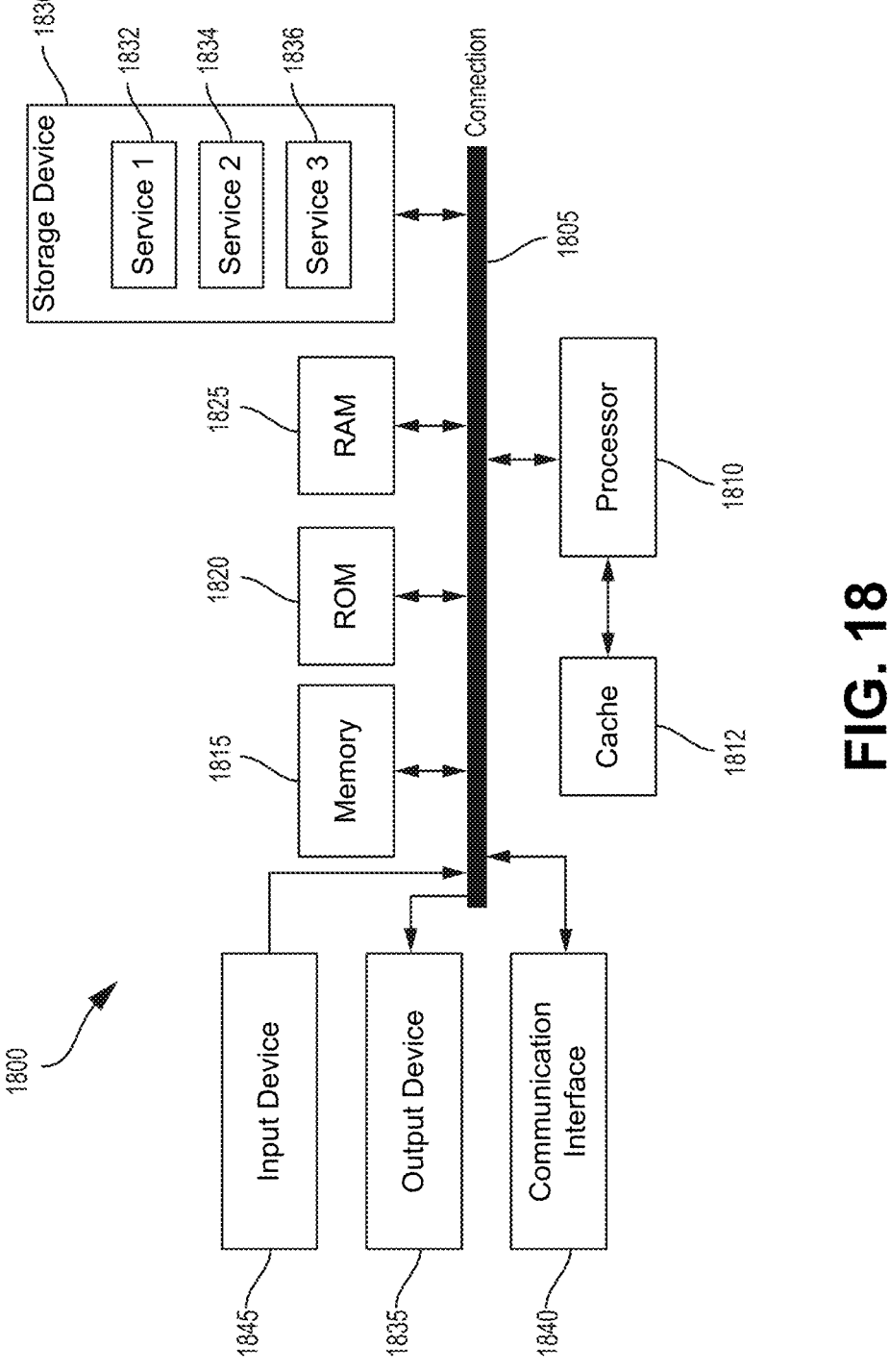
FIG. 18 is a block diagram illustrating an example of a computing system for implementing certain aspects described herein.

FIG. 18 illustrates an example computing device architecture 1800 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 1800 can implement the system of FIG. 5. The components of computing device architecture 1800 are shown in electrical communication with each other using connection 1805, such as a bus. The example computing device architecture 1800 includes a processing unit (CPU or processor) 1810 and computing device connection 1805 that couples various computing device components including computing device memory 1815, such as read only memory (ROM) 1820 and random-access memory (RAM) 1825, to processor 1810.

Computing device architecture 1800 can include a cache of high-speed memory connected directly with, in close proximity to, or integrated as part of processor 1810. Computing device architecture 1800 can copy data from memory 1815 and/or the storage device 1830 to cache 1812 for quick access by processor 1810. In this way, the cache can provide a performance boost that avoids processor 1810 delays while waiting for data. These and other engines can control or be configured to control processor 1810 to perform various actions. Other computing device memory 1815 may be available for use as well. Memory 1815 can include multiple different types of memory with different performance characteristics. Processor 1810 can include any general-purpose processor and a hardware or software service, such as service 1 1832, service 2 1834, and service 3 1836 stored in storage device 1830, configured to control processor 1810 as well as a special-purpose processor where software instructions are incorporated into the processor design. Processor 1810 may be a self-contained system, containing multiple cores or processors, a bus, memory controller, cache, etc. A multi-core processor may be symmetric or asymmetric.

To enable user interaction with the computing device architecture 1800, input device 1845 can represent any number of input mechanisms, such as a microphone for speech, a touch-sensitive screen for gesture or graphical input, keyboard, mouse, motion input, speech and so forth. Output device 1835 can also be one or more of a number of output mechanisms known to those of skill in the art, such as a display, projector, television, speaker device, etc. In some instances, multimodal computing devices can enable a user to provide multiple types of input to communicate with computing device architecture 1800. Communication interface 1840 can generally govern and manage the user input and computing device output. There is no restriction on operating on any particular hardware arrangement and therefore the basic features here may easily be substituted for improved hardware or firmware arrangements as they are developed.

Storage device 1830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1825, read only memory (ROM) 1820, and hybrids thereof. Storage device 1830 can include services 1832, 1834, 1836 for controlling processor 1810. Other hardware or software modules or engines are contemplated. Storage device 1830 can be connected to the computing device connection 1805. In one aspect, a hardware module that performs a particular function can include the software component stored in a computer-readable medium in connection with the necessary hardware components, such as processor 1810, connection 1805, output device 1835, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects or examples. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that aspects and examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects and examples in unnecessary detail. In other instances, well-known circuits, processes, algorithms, structures, and techniques may be shown without unnecessary detail in order to avoid obscuring the aspects and examples.

Individual aspects and examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects and examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects and examples thereof, but those skilled in the art will recognize that the application is not limited thereto. Thus, while illustrative aspects and examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects and examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects and examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

The various illustrative logical blocks, modules, engines, circuits, and algorithm steps described in connection with the aspects and examples disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A method comprising: obtaining first image data of a scene, the first image data associated with a first zoom level and including at least a foreground portion and a background portion; receiving a user input indicative of an adjustment to increase or decrease a zoom level of the foreground portion relative to the background portion included in the first image data; obtaining a second image data of the scene based on the adjustment and using the second zoom level, the second image data including at least an adjusted foreground portion associated with the second zoom level; generating a segmented foreground portion based on segmenting the adjusted foreground portion from the second image data of the scene; and generating a composite image based on combining the segmented foreground portion from the second image data of the scene with at least a portion of the first image data of the scene.

Aspect 2. The method of Aspect 1, further comprising: receiving a command to capture an image frame corresponding to the composite image.

Aspect 3. The method of any of Aspects 1 to 2, wherein generating the composite image includes: outputting a first frame corresponding to the composite image; and receiving an input to capture a frame, wherein the input is received subsequent to outputting the first frame.

Aspect 4. The method of Aspect 3, wherein generating the composite image further includes: outputting a captured frame corresponding to the composite image, based on receiving the input to capture a frame.

Aspect 5. The method of Aspect 4, wherein the first frame is a preview frame corresponding to the composite image, and wherein the captured frame is the composite image.

Aspect 6. The method of any of Aspects 4 to 5, wherein the captured frame is different from the first frame.

Aspect 7. The method of any of Aspects 1 to 6, wherein generating the composite image includes: outputting a first frame corresponding to a composite image; and receiving an input to capture a frame, wherein the input is received subsequent to outputting the first frame.

Aspect 8. The method of Aspect 7, wherein: the first image data comprises first image data obtained using a first camera having a first focal length; and the second image data comprises second image data obtained using a second camera having a second focal length.

Aspect 9. The method of Aspect 8, wherein the first image data and the second image data are obtained prior to receiving an input to capture a frame.

Aspect 10. The method of Aspect 9, wherein the first image data is associated with a preview frame obtained using the first camera, and wherein the second image data is associated with a preview frame obtained using the second camera.

Aspect 11. The method of any of Aspects 8 to 10, wherein outputting the first frame includes: displaying, using an image capture user interface (UI), a portion of the first image data composited with a portion of the second image data.

Aspect 12. The method of Aspect 11, wherein the input to capture a frame is a command to capture the composite image and comprises a user input to the image capture UI.

Aspect 13. The method of Aspect 12, wherein the user input corresponds to a shutter button of the image capture UI.

Aspect 14. The method of any of Aspects 1 to 13, further comprising outputting the composite image prior to receiving a command to capture an image.

Aspect 15. The method of any of Aspects 1 to 14, further comprising: outputting a preview of the composite image; and receiving a command to capture a composite image frame corresponding to the preview of the composite image.

Aspect 16. The method of any of Aspects 1 to 15, further comprising: outputting a preview of the composite image; and receiving the user input indicative of the adjustment to increase or decrease the zoom level of the foreground portion based on the preview of the composite image.

Aspect 17. The method of Aspect 16, further comprising: receiving a user input indicative of an adjustment to increase or decrease one or more of the first zoom level or the second zoom level based on the preview of the composite image.

Aspect 18. The method of any of Aspects 1 to 17, further comprising: displaying the composite image in a preview, wherein the preview includes the composite image and at least a first graphical user interface (GUI) associated with receiving the user input indicative of the adjustment to increase or decrease the zoom level of the foreground portion.

Aspect 19. The method of Aspect 18, wherein the preview comprises the first GUI overlaid on the composite image.

Aspect 20. The method of any of Aspects 18 to 19, wherein the first GUI is collapsible within the preview.

Aspect 21. The method of Aspect 20, further comprising: receiving a user input to one or more of the preview or the first GUI; and collapsing the first GUI based on the user input, wherein collapsing the first GUI comprises removing from the preview an overlay of the first GUI.

Aspect 22. The method of any of Aspects 1 to 21, wherein generating the segmented foreground portion comprises: determining, based on the second image data, a segmentation map classifying each pixel of a plurality of pixels of the second image data into a foreground class or a non-foreground class; and multiplying the segmentation map with the second image data.

Aspect 23. The method of Aspect 22, further comprising: generating a matting map corresponding to the segmentation map, wherein the matting map includes a transparency value for at least a portion of a plurality of pixels of the segmentation map classified as the foreground class; and generating the segmented foreground portion based on combining the segmentation map and the matting map.

Aspect 24. The method of any of Aspects 1 to 23, further comprising: determining, based on the second image data of the scene, shadow matting information corresponding to a shadow of the foreground portion; and updating, using the shadow matting information, the segmented foreground portion to further include pixels of the second image data corresponding to the shadow of the foreground portion.

Aspect 25. The method of any of Aspects 1 to 24, further comprising: removing, from the first image data and based on segmentation information of the foreground portion in the first image data, pixels corresponding to the foreground portion; and generating, using an image completion engine, an inpainted first image data, wherein each removed pixel of the pixels corresponding to the foreground portion in the first image data is replaced with a corresponding inpainted pixel.

Aspect 26. The method of Aspect 25, wherein generating the composite image includes: generating an inverted segmentation map based on inverting a segmentation map corresponding to the segmented foreground portion from the second image data; and adding the segmented foreground portion to a product of the inverted segmentation map with the inpainted first image data.

Aspect 27. The method of Aspect 26, wherein the composite image includes background image data of the scene associated with the first zoom level and an adjusted foreground portion image data corresponding to the second zoom level and the user input indicative of the adjustment.

Aspect 28. The method of any of Aspects 1 to 27, wherein the second image data is obtained based on the adjustment to increase or decrease the zoom level of the foreground portion relative to the background portion.

Aspect 29. The method of any of Aspects 1 to 28, wherein: the adjustment to increase or decrease the zoom level of the foreground portion is an adjustment to increase the zoom level of the foreground portion relative to the background portion included in the first image data; and the second zoom level is greater than the first zoom level.

Aspect 30. The method of any of Aspects 1 to 29, wherein: the adjustment to increase or decrease the zoom level of the foreground portion is an adjustment to decrease the zoom level of the foreground portion relative to the background portion included in the first image data; and the second zoom level is less than the first zoom level.

Aspect 31. The method of any of Aspects 1 to 30, wherein receiving the user input indicative of the adjustment to increase or decrease the zoom level of the foreground portion relative to the background portion comprises: receiving a first user input indicative of a selected foreground portion from one or more foreground portions included in the first image data of the scene; and receiving a second user input indicative of the adjustment to increase or decrease the zoom level of the selected foreground portion relative to the background portion.

Aspect 32. The method of any of Aspects 1 to 31, further comprising: receiving a user input indicative of an additional adjustment to increase or decrease a zoom level of the background portion relative to the foreground portion included in the first image data; obtaining a third image data of the scene based on the additional adjustment and using a third zoom level corresponding to the additional adjustment, the third image data including at least an adjusted background portion associated with the third zoom level; generating a segmented background portion based on segmenting the adjusted background portion from the third image data of the scene; and generating the composite image based on combining the segmented foreground portion from the second image data of the scene with the segmented background portion from the third image data of the scene and a portion of the first image data of the scene.

Aspect 33. The method of any of Aspects 1 to 32, further comprising: receiving an additional user input indicative of an adjustment to a position of the foreground portion; and generating the composite image further based on translating the segmented foreground portion based on the additional user input, wherein the segmented foreground portion is translated relative to the portion of the first image data of the scene.

Aspect 34. The method of Aspect 33, wherein translating the segmented foreground portion is based on generating a translated segmentation map corresponding to the segmented foreground portion and the additional user input indicative of the adjustment to the position of the foreground portion.

Aspect 35. The method of any of Aspects 1 to 34, wherein: the first image data is associated with a first camera having a first focal length corresponding to the first zoom level; and the second image data is associated with a second camera having a second focal length corresponding to the second zoom level.

Aspect 36. The method of Aspect 35, wherein the first camera is different from the second camera, and wherein the first camera and the second camera are included in an imaging system of a computing device.

Aspect 37. The method of any of Aspects 1 to 36, wherein obtaining the second image data of the scene comprises: scaling the first image data to obtain a scaled first image data, wherein the scaled first image data is associated with the second zoom level, and wherein the scaled first image data includes a scaled foreground portion corresponding to the foreground portion.

Aspect 38. The method of any of Aspects 1 to 37, wherein the user input indicative of the adjustment to the zoom level of the foreground portion is received in a graphical user interface (GUI).

Aspect 39. The method of Aspect 38, wherein the GUI comprises a slider, wherein moving the slider in a first direction is indicative of an increase to the zoom level and moving the slider in a second direction is indicative of a decrease to the zoom level.

Aspect 40. The method of any of Aspects 38 to 39, wherein the GUI includes a plurality of discrete step adjustments, each discrete step adjustment of the plurality of discrete step adjustments corresponding to a configured increase or decrease to the zoom level.

Aspect 41. The method of any of Aspects 1 to 40, further comprising: receiving, using a first graphical user interface (GUI), the user input indicative of the adjustment to the zoom level of the foreground portion; and receiving, using a second GUI, a user input indicative of an adjustment to a zoom level of the background portion.

Aspect 42. The method of Aspect 41, wherein the composite image further includes the first GUI and the second GUI.

Aspect 43. The method of Aspect 42, further comprising: displaying the composite image in a preview, wherein the preview includes the composite image, the first GUI, and the second GUI.

Aspect 44. The method of Aspect 43, wherein displaying the composite image in the preview comprises: outputting a preview image data corresponding to the composite image; overlaying the first GUI on top of the preview image data; and overlaying the second GUI on top of the preview image data.

Aspect 45. The method of any of Aspects 43 to 44, wherein one or more of the first GUI or the second GUI is collapsible within the preview.

Aspect 46. The method of any of Aspects 43 to 45, wherein the composite image further includes a third GUI element.

Aspect 47. The method of Aspect 46, wherein the third GUI element comprises a capture icon associated with capturing the composite image.

Aspect 48. The method of any of Aspects 1 to 47, further comprising: receiving a user input indicative of an adjustment to increase or decrease a zoom level of the background portion relative to the foreground portion included in the first image data; automatically determining a corresponding adjustment to increase or decrease the zoom level of the foreground portion, wherein the corresponding adjustment is automatically determined relative to the user input indicative of the adjustment to increase or decrease the zoom level of the background portion; and generating the composite image based on the adjustment to increase or decrease the zoom level of the background portion and the automatically determined corresponding adjustment to increase or decrease the zoom level of the foreground portion.

Aspect 49. The method of any of Aspects 1 to 48, further comprising: automatically determining a corresponding adjustment to increase or decrease a zoom level of the background portion relative to the foreground portion included in the first image data, based on receiving the user input indicative of the adjustment to increase or decrease the zoom level of the foreground portion; and generating the composite image based on the adjustment to increase or decrease the zoom level of the foreground portion and the automatically determined corresponding adjustment to increase or decrease the zoom level of the background portion.

Aspect 50. An apparatus for processing image data, comprising: at least one memory; and at least one processor coupled to the at least one memory, the at least one processor configured to: obtain first image data of a scene, the first image data associated with a first zoom level and including at least a foreground portion and a background portion; receive a user input indicative of an adjustment to increase or decrease a zoom level of the foreground portion relative to the background portion included in the first image data; obtain a second image data of the scene based on the adjustment and using the second zoom level, the second image data including at least an adjusted foreground portion associated with the second zoom level; generate a segmented foreground portion based on segmenting the adjusted foreground portion from the second image data of the scene; and generate a composite image based on combining the segmented foreground portion from the second image data of the scene with at least a portion of the first image data of the scene.

Aspect 51. The apparatus of Aspect 50, wherein the at least one processor is further configured to: receive a command to capture an image frame corresponding to the composite image.

Aspect 52. The apparatus of any of Aspects 50 to 51, wherein, to generate the composite image, the at least one processor is configured to: output a first frame corresponding to the composite image; and receive an input to capture a frame, wherein the input is received subsequent to the output of the first frame.

Aspect 53. The apparatus of Aspect 52, wherein, to generate the composite image, the at least one processor is further configured to: output a captured frame corresponding to the composite image, wherein the captured frame is output based on the input to capture a frame.

Aspect 54. The apparatus of Aspect 53, wherein the first frame is a preview frame corresponding to the composite image, and wherein the captured frame is the composite image.

Aspect 55. The apparatus of any of Aspects 53 to 54, wherein the captured frame is different from the first frame.

Aspect 56. The apparatus of any of Aspects 50 to 55, wherein, to generate the composite image, the at least one processor is configured to: output a first frame corresponding to a composite image; and receive an input to capture a frame, wherein the input is received subsequent to the output of the first frame.

Aspect 57. The apparatus of Aspect 56, wherein: the first image data comprises first image data obtained using a first camera having a first focal length; and the second image data comprises second image data obtained using a second camera having a second focal length.

Aspect 58. The apparatus of Aspect 57, wherein the first image data and the second image data are obtained prior to receiving an input to capture a frame.

Aspect 59. The apparatus of Aspect 58, wherein the first image data is associated with a preview frame obtained using the first camera, and wherein the second image data is associated with a preview frame obtained using the second camera.

Aspect 60. The apparatus of any of Aspects 57 to 59, wherein, to output the first frame, the at least one processor is configured to: display, using an image capture user interface (UI), a portion of the first image data composited with a portion of the second image data.

Aspect 61. The apparatus of Aspect 60, wherein the input to capture a frame is a command to capture the composite image and comprises a user input to the image capture UI.

Aspect 62. The apparatus of Aspect 61, wherein the user input corresponds to a shutter button of the image capture UI.

Aspect 63. The apparatus of any of Aspects 50 to 62, wherein the at least one processor is further configured to output the composite image prior to receiving a command to capture an image.

Aspect 64. The apparatus of any of Aspects 50 to 63, wherein the at least one processor is further configured to: output a preview of the composite image; and receive a command to capture a composite image frame corresponding to the preview of the composite image.

Aspect 65. The apparatus of any of Aspects 50 to 64, wherein the at least one processor is further configured to: output a preview of the composite image; and receive the user input indicative of the adjustment to increase or decrease the zoom level of the foreground portion based on the preview of the composite image.

Aspect 66. The apparatus of Aspect 65, wherein the at least one processor is further configured to: receive a user input indicative of an adjustment to increase or decrease one or more of the first zoom level or the second zoom level based on the preview of the composite image.

Aspect 67. The apparatus of any of Aspects 50 to 66, wherein the at least one processor is further configured to: display the composite image in a preview, wherein the preview includes the composite image and at least a first graphical user interface (GUI) associated with receiving the user input indicative of the adjustment to increase or decrease the zoom level of the foreground portion.

Aspect 68. The apparatus of Aspect 67, wherein the preview comprises the first GUI overlaid on the composite image.

Aspect 69. The apparatus of any of Aspects 67 to 68, wherein the first GUI is collapsible within the preview.

Aspect 70. The apparatus of Aspect 69, wherein the at least one processor is further configured to: receive a user input to one or more of the preview or the first GUI; and collapse the first GUI based on the user input, wherein collapsing the first GUI comprises removing from the preview an overlay of the first GUI.

Aspect 71. The apparatus of any of Aspects 50 to 70, wherein, to generate the segmented foreground portion, the at least one processor is configured to: determine, based on the second image data, a segmentation map classifying each pixel of a plurality of pixels of the second image data into a foreground class or a non-foreground class; and multiply the segmentation map with the second image data.

Aspect 72. The apparatus of Aspect 71, wherein the at least one processor is further configured to: generate a matting map corresponding to the segmentation map, wherein the matting map includes a transparency value for at least a portion of a plurality of pixels of the segmentation map classified as the foreground class; and generate the segmented foreground portion based on combining the segmentation map and the matting map.

Aspect 73. The apparatus of any of Aspects 50 to 72, wherein the at least one processor is further configured to: determine, based on the second image data of the scene, shadow matting information corresponding to a shadow of the foreground portion; and update, using the shadow matting information, the segmented foreground portion to further include pixels of the second image data corresponding to the shadow of the foreground portion.

Aspect 74. The apparatus of any of Aspects 50 to 73, wherein the at least one processor is further configured to: remove, from the first image data and based on segmentation information of the foreground portion in the first image data, pixels corresponding to the foreground portion; and generate, using an image completion engine, an inpainted first image data, wherein each removed pixel of the pixels corresponding to the foreground portion in the first image data is replaced with a corresponding inpainted pixel.

Aspect 75. The apparatus of Aspect 74, wherein generating the composite image includes: generate an inverted segmentation map based on inverting a segmentation map corresponding to the segmented foreground portion from the second image data; and add the segmented foreground portion to a product of the inverted segmentation map with the inpainted first image data.

Aspect 76. The apparatus of Aspect 75, wherein the composite image includes background image data of the scene associated with the first zoom level and an adjusted foreground portion image data corresponding to the second zoom level and the user input indicative of the adjustment.

Aspect 77. The apparatus of any of Aspects 50 to 76, wherein the second image data is obtained based on the adjustment to increase or decrease the zoom level of the foreground portion relative to the background portion.

Aspect 78. The apparatus of any of Aspects 50 to 77, wherein: the adjustment to increase or decrease the zoom level of the foreground portion is an adjustment to increase the zoom level of the foreground portion relative to the background portion included in the first image data; and the second zoom level is greater than the first zoom level.

Aspect 79. The apparatus of any of Aspects 50 to 78, wherein: the adjustment to increase or decrease the zoom level of the foreground portion is an adjustment to decrease the zoom level of the foreground portion relative to the background portion included in the first image data; and the second zoom level is less than the first zoom level.

Aspect 80. The apparatus of any of Aspects 50 to 79, wherein, to receive the user input indicative of the adjustment to increase or decrease the zoom level of the foreground portion relative to the background portion, the at least one processor is configured to: receive a first user input indicative of a selected foreground portion from one or more foreground portions included in the first image data of the scene; and receive a second user input indicative of the adjustment to increase or decrease the zoom level of the selected foreground portion relative to the background portion.

Aspect 81. The apparatus of any of Aspects 50 to 80, wherein the at least one processor is further configured to: receive a user input indicative of an additional adjustment to increase or decrease a zoom level of the background portion relative to the foreground portion included in the first image data; obtain a third image data of the scene based on the additional adjustment and using a third zoom level corresponding to the additional adjustment, the third image data including at least an adjusted background portion associated with the third zoom level; generate a segmented background portion based on segmenting the adjusted background portion from the third image data of the scene; and generate the composite image based on combining the segmented foreground portion from the second image data of the scene with the segmented background portion from the third image data of the scene and a portion of the first image data of the scene.

Aspect 82. The apparatus of any of Aspects 50 to 81, wherein the at least one processor is further configured to: receive an additional user input indicative of an adjustment to a position of the foreground portion; and generate the composite image further based on translating the segmented foreground portion based on the additional user input, wherein the segmented foreground portion is translated relative to the portion of the first image data of the scene.

Aspect 83. The apparatus of Aspect 82, wherein, to translate the segmented foreground portion, the at least one processor is configured to generate a translated segmentation map corresponding to the segmented foreground portion and the additional user input indicative of the adjustment to the position of the foreground portion.

Aspect 84. The apparatus of any of Aspects 50 to 83, wherein: the first image data is associated with a first camera having a first focal length corresponding to the first zoom level; and the second image data is associated with a second camera having a second focal length corresponding to the second zoom level.

Aspect 85. The apparatus of Aspect 84, wherein the first camera is different from the second camera, and wherein the first camera and the second camera are included in an imaging system of a computing device.

Aspect 86. The apparatus of any of Aspects 50 to 85, wherein, to obtain the second image data of the scene, the at least one processor is configured to: scale the first image data to obtain a scaled first image data, wherein the scaled first image data is associated with the second zoom level, and wherein the scaled first image data includes a scaled foreground portion corresponding to the foreground portion.

Aspect 87. The apparatus of any of Aspects 50 to 86, wherein the user input indicative of the adjustment to the zoom level of the foreground portion is received in a graphical user interface (GUI).

Aspect 88. The apparatus of Aspect 87, wherein the GUI comprises a slider, wherein moving the slider in a first direction is indicative of an increase to the zoom level and moving the slider in a second direction is indicative of a decrease to the zoom level.

Aspect 89. The apparatus of Aspect 88, wherein the GUI includes a plurality of discrete step adjustments, each discrete step adjustment of the plurality of discrete step adjustments corresponding to a configured increase or decrease to the zoom level.

Aspect 90. The apparatus of any of Aspects 50 to 89, wherein the at least one processor is further configured to: receive, using a first graphical user interface (GUI), the user input indicative of the adjustment to the zoom level of the foreground portion; and receive, using a second GUI, a user input indicative of an adjustment to a zoom level of the background portion.

Aspect 91. The apparatus of Aspect 90, wherein the composite image further includes the first GUI and the second GUI.

Aspect 92. The apparatus of Aspect 91, wherein the at least one processor is further configured to: display the composite image in a preview, wherein the preview includes the composite image, the first GUI, and the second GUI.

Aspect 93. The apparatus of Aspect 92, wherein, to display the composite image in the preview, the at least one processor is configured to: output a preview image data corresponding to the composite image; overlay the first GUI on top of the preview image data; and overlay the second GUI on top of the preview image data.

Aspect 94. The apparatus of any of Aspects 92 to 93, wherein one or more of the first GUI or the second GUI is collapsible within the preview.

Aspect 95. The apparatus of any of Aspects 92 to 94, wherein the composite image further includes a third GUI element.

Aspect 96. The apparatus of Aspect 95, wherein the third GUI element comprises a capture icon associated with capturing the composite image.

Aspect 97. The apparatus of any of Aspects 50 to 96, wherein the at least one processor is further configured to: receive a user input indicative of an adjustment to increase or decrease a zoom level of the background portion relative to the foreground portion included in the first image data; automatically determine a corresponding adjustment to increase or decrease the zoom level of the foreground portion, wherein the corresponding adjustment is automatically determined relative to the user input indicative of the adjustment to increase or decrease the zoom level of the background portion; and generate the composite image based on the adjustment to increase or decrease the zoom level of the background portion and the automatically determined corresponding adjustment to increase or decrease the zoom level of the foreground portion.

Aspect 98. The apparatus of any of Aspects 50 to 97, wherein the at least one processor is further configured to: automatically determine a corresponding adjustment to increase or decrease a zoom level of the background portion relative to the foreground portion included in the first image data, based on receiving the user input indicative of the adjustment to increase or decrease the zoom level of the foreground portion; and generate the composite image based on the adjustment to increase or decrease the zoom level of the foreground portion and the automatically determined corresponding adjustment to increase or decrease the zoom level of the background portion.

Aspect 99. A non-transitory computer-readable storage medium comprising instructions stored thereon which, when executed by at least one processor, causes the at least one processor to perform operations according to any of Aspects 1 to 49, and/or 103.

Aspect 100. A non-transitory computer-readable storage medium comprising instructions stored thereon which, when executed by at least one processor, causes the at least one processor to perform operations according to any of Aspects 50 to 98, and/or 104.

Aspect 101. An apparatus comprising one or more means for performing operations according to any of Aspects 1 to 49, and/or 103.

Aspect 102. An apparatus comprising one or more means for performing operations according to any of Aspects 50 to 98, and/or 104.

Aspect 103. The method of any of Aspects 1 to 49, wherein the adjustment to increase or decrease the zoom level of the foreground portion relative to the background portion corresponds to a second zoom level greater than the first zoom level or a second zoom level less than the first zoom level.

Aspect 104. The apparatus of any of Aspects 50 to 98, wherein the adjustment to increase or decrease the zoom level of the foreground portion relative to the background portion corresponds to a second zoom level greater than the first zoom level or a second zoom level less than the first zoom level.

What is claimed is:

1. A method comprising:
receiving, using a first graphical user interface (GUI), a first user input indicative of a zoom level for a scene;
obtaining, based on the first user input, first image data of the scene, wherein the first image data is associated with a first zoom level corresponding to the zoom level for the scene, and wherein the first image data includes at least a foreground portion and a background portion;
receiving, using a second GUI, a second user input indicative of an adjustment to increase or decrease a zoom level of the foreground portion relative to the background portion included in the first image data, wherein the adjustment corresponds to a second zoom level greater than the first zoom level or a second zoom level less than the first zoom level;
obtaining a second image data of the scene based on the adjustment and using the second zoom level, the second image data including at least an adjusted foreground portion associated with the second zoom level;
generating a segmented foreground portion associated with the second zoom level based on segmenting the adjusted foreground portion from the second image data of the scene; and
generating a composite image based on combining the segmented foreground portion from the second image data of the scene with at least a portion of the first image data of the scene.

2. The method of claim 1, further comprising:
outputting a first frame corresponding to the composite image;
receiving a command to capture an image frame corresponding to the composite image, wherein the first frame is outputted prior to receiving the command to capture the image frame; and
outputting a captured frame corresponding to the composite image, based on receiving the command to capture the image frame.

3. The method of claim 2, wherein:
the first frame is a preview frame corresponding to the composite image;
the captured frame is the composite image; and
the captured frame is different from the first frame.

4. The method of claim 1, wherein:
the first image data comprises first image data obtained using a first camera having a first focal length; and
the second image data comprises second image data obtained using a second camera having a second focal length.

5. The method of claim 4, wherein generating the composite image includes:
outputting, using an image capture user interface (UI), a first frame corresponding to the composite image, wherein the first frame includes a portion of the first image data composited with a portion of the second image data; and
receiving an input to capture a frame, wherein the input is received subsequent to outputting the first frame and comprises a user input to the image capture UI.

6. The method of claim 1, further comprising:

outputting a preview of the composite image; and receiving a third user input indicative of an adjustment to increase or decrease one or more of the first zoom level or the second zoom level based on the preview of the composite image.

7. The method of claim 1, wherein the second image data is obtained based on the second user input indicative of the adjustment to increase or decrease the zoom level of the foreground portion relative to the background portion.

8. The method of claim 1, wherein receiving the second user input indicative of the adjustment to increase or decrease the zoom level of the foreground portion relative to the background portion comprises:

receiving a user input indicative of a selected foreground portion from one or more foreground portions included in the first image data of the scene; and receiving a user input indicative of the adjustment to increase or decrease the zoom level of the selected foreground portion relative to the background portion.

9. The method of claim 1, wherein:

the first user input is indicative of an adjustment to increase or decrease a zoom level of the background portion.

10. A non-transitory computer-readable medium having stored thereon instructions that, when executed by one or more processors, cause the one or more processors to:

receive, using a first graphical user interface (GUI), a first user input indicative of a zoom level for a scene;

obtain, based on the first user input, first image data of the scene, wherein the first image data is associated with a first zoom level corresponding to the zoom level for the scene, and wherein the first image data includes at least a foreground portion and a background portion;

receive, using a second GUI, a second user input indicative of an adjustment to increase or decrease a zoom level of the foreground portion relative to the background portion included in the first image data, wherein the adjustment corresponds to a second zoom level greater than the first zoom level or a second zoom level less than the first zoom level;

obtain a second image data of the scene based on the adjustment and using the second zoom level, the second image data including at least an adjusted foreground portion associated with the second zoom level;

generate a segmented foreground portion associated with the second zoom level based on segmenting the adjusted foreground portion from the second image data of the scene; and generate a composite image based on combining the segmented foreground portion from the second image data of the scene with at least a portion of the first image data of the scene.

11. An apparatus for processing image data, comprising:

at least one memory; and at least one processor coupled to the at least one memory, the at least one processor configured to:

receive, using a first graphical user interface (GUI), a first user input indicative of a zoom level for a scene;

obtain, based on the first user input, first image data of the scene, wherein the first image data is associated with a first zoom level corresponding to the zoom level for the scene, and wherein the first image data includes at least a foreground portion and a background portion;

receive, using a second GUI, a second user input indicative of an adjustment to increase or decrease a zoom level of the foreground portion relative to the background portion included in the first image data, wherein the adjustment corresponds to a second zoom level greater than the first zoom level or a second zoom level less than the first zoom level;

obtain a second image data of the scene based on the adjustment and using the second zoom level, the second image data including at least an adjusted foreground portion associated with the second zoom level;

generate a segmented foreground portion associated with the second zoom level based on segmenting the adjusted foreground portion from the second image data of the scene; and generate a composite image based on combining the segmented foreground portion from the second image data of the scene with at least a portion of the first image data of the scene.

12. The apparatus of claim 11, wherein the at least one processor is further configured to:

receive a command to capture an image frame corresponding to the composite image.

13. The apparatus of claim 12, wherein, to generate the composite image, the at least one processor is configured to:

output a first frame corresponding to the composite image, wherein the first frame is output prior to receiving the command to capture the image frame corresponding to the composite image.

14. The apparatus of claim 13, wherein, to generate the composite image, the at least one processor is further configured to:

output a captured frame corresponding to the composite image, wherein the captured frame is output based on receiving the command to capture the image frame.

15. The apparatus of claim 14, wherein the first frame is a preview frame corresponding to the composite image, and wherein the captured frame is the composite image.

16. The apparatus of claim 14, wherein the captured frame is different from the first frame.

17. The apparatus of claim 11, wherein, to generate the composite image, the at least one processor is configured to:

output a first frame corresponding to a composite image; and receive an input to capture a frame, wherein the input is received subsequent to the output of the first frame.

18. The apparatus of claim 17, wherein:

the first image data comprises first image data obtained using a first camera having a first focal length; and the second image data comprises second image data obtained using a second camera having a second focal length.

19. The apparatus of claim 18, wherein the first image data and the second image data are obtained prior to receiving an input to capture a frame.

20. The apparatus of claim 19, wherein the first image data is associated with a preview frame obtained using the first camera, and wherein the second image data is associated with a preview frame obtained using the second camera.

21. The apparatus of claim 18, wherein, to output the first frame, the at least one processor is configured to:

display, using an image capture user interface (UI), a portion of the first image data composited with a portion of the second image data.

22. The apparatus of claim 21, wherein the input to capture a frame is a command to capture the composite image and comprises a user input to the image capture UI.

23. The apparatus of claim 22, wherein the user input corresponds to a shutter button of the image capture UI.

24. The apparatus of claim 11, wherein the at least one processor is further configured to:

output a preview of the composite image; and receive the second user input indicative of the adjustment to increase or decrease the zoom level of the foreground portion based on the preview of the composite image.

25. The apparatus of claim 24, wherein the at least one processor is further configured to:

receive a third user input indicative of an adjustment to increase or decrease one or more of the first zoom level or the second zoom level based on the preview of the composite image.

26. The apparatus of claim 11, wherein the at least one processor is further configured to:

display the composite image in a preview, wherein the preview includes the composite image and at least the second GUI associated with receiving the second user input indicative of the adjustment to increase or decrease the zoom level of the foreground portion.

27. The apparatus of claim 26, wherein the preview comprises the first second GUI overlaid on the composite image.

28. The apparatus of claim 11, wherein the at least one processor is further configured to:

remove, from the first image data and based on segmentation information of the foreground portion in the first image data, pixels corresponding to the foreground portion; and generate, using an image completion engine, an inpainted first image data, wherein each removed pixel of the pixels corresponding to the foreground portion in the first image data is replaced with a corresponding inpainted pixel.

29. The apparatus of claim 11, wherein the second image data is obtained based on the second user input indicative of the adjustment to increase or decrease the zoom level of the foreground portion relative to the background portion.

30. The apparatus of claim 11, wherein, to receive the second user input indicative of the adjustment to increase or decrease the zoom level of the foreground portion relative to the background portion, the at least one processor is configured to:

receive a user input indicative of a selected foreground portion from one or more foreground portions included in the first image data of the scene; and receive a user input indicative of the adjustment to increase or decrease the zoom level of the selected foreground portion relative to the background portion.

31. The apparatus of claim 11, wherein the at least one processor is further configured to:

receive a third user input indicative of an additional adjustment to increase or decrease a zoom level of the background portion relative to the foreground portion included in the first image data;

obtain a third image data of the scene based on the additional adjustment and using a third zoom level corresponding to the additional adjustment, the third image data including at least an adjusted background portion associated with the third zoom level;

generate a segmented background portion based on segmenting the adjusted background portion from the third image data of the scene; and generate the composite image based on combining the segmented foreground portion from the second image data of the scene with the segmented background portion from the third image data of the scene and a portion of the first image data of the scene.

32. The apparatus of claim 11, wherein the at least one processor is further configured to:

receive an additional user input indicative of an adjustment to a position of the foreground portion; and generate the composite image further based on translating the segmented foreground portion based on the additional user input, wherein the segmented foreground portion is translated relative to the portion of the first image data of the scene.

33. The apparatus of claim 11, wherein, to obtain the second image data of the scene, the at least one processor is configured to:

scale the first image data to obtain a scaled first image data, wherein the scaled first image data is associated with the second zoom level, and wherein the scaled first image data includes a scaled foreground portion corresponding to the foreground portion.

34. The apparatus of claim 11, wherein the second user input indicative of the adjustment to increase or decrease the zoom level of the foreground portion is received in a slider GUI element of the second GUI.

35. The apparatus of claim 34, wherein the second user input moving the slider GUI element in a first direction is indicative of an increase to the zoom level and wherein the second user input moving the slider GUI element in a second direction is indicative of a decrease to the zoom level.

36. The apparatus of claim 35, wherein the second GUI includes a plurality of discrete step adjustments, each discrete step adjustment of the plurality of discrete step adjustments corresponding to a configured increase or decrease to the zoom level.

37. The apparatus of claim 11, wherein the first user input is indicative of an adjustment to increase or decrease a zoom level of the background portion.

38. The apparatus of claim 11, wherein the at least one processor is further configured to:

determine, based on the first user input, an adjustment to increase or decrease a zoom level of the background portion relative to the foreground portion included in the first image data;

automatically determine a corresponding adjustment to increase or decrease the zoom level of the foreground portion, wherein the corresponding adjustment is automatically determined relative to the first user input indicative of the adjustment to increase or decrease the zoom level of the background portion; and generate the composite image based on the adjustment to increase or decrease the zoom level of the background portion and the automatically determined corresponding adjustment to increase or decrease the zoom level of the foreground portion.

39. The apparatus of claim 11, wherein the at least one processor is further configured to:

automatically determine a corresponding adjustment to increase or decrease a zoom level of the background portion relative to the foreground portion included in the first image data, based on receiving the second user input indicative of the adjustment to increase or decrease the zoom level of the foreground portion; and generate the composite image based on the adjustment to increase or decrease the zoom level of the foreground portion and the automatically determined correspond-
ing adjustment to increase or decrease the zoom level
of the background portion.

<center>* * * * *</center>